United States Patent [19]

Groginsky

[11] 3,742,201

[45] June 26, 1973

[54] TRANSFORMER SYSTEM FOR ORTHOGONAL DIGITAL WAVEFORMS

[75] Inventor: Herbert L. Groginsky, Wellesley, Mass.

[73] Assignee: Raytheon Company, Lexington, Mass.

[22] Filed: Feb. 22, 1971

[21] Appl. No.: 117,472

[52] U.S. Cl. .......... 235/156
[51] Int. Cl. .......... G06f 7/38, G06f 15/34
[58] Field of Search .......... 235/156, 197

[56] References Cited

UNITED STATES PATENTS

| | | | |
|---|---|---|---|
| 3,588,460 | 6/1971 | Smith | 235/156 |
| 3,517,173 | 6/1970 | Gilmartin, Jr. et al. | 235/156 |

OTHER PUBLICATIONS

H. F. Harmuth, Transmission of Infor. by Orthogonal Functions Springer – Verlag, 1969, pp. 104–105.
H. F. Harmuth, "Applications of Walsh Functions in Communications," IEEE Spectrum, Nov. 1969, pp. 82–91.
K. Siemens & R. Kitai, "Digital Walsh-Fourier Analysis of Periodic Waveforms," IEEE Trans. on Instr. & Meas., Dec. 1969, pp. 316–321.
J. Shanks, "Comp. of the Fast-Walsh-Fourier Transform," IEEE Trans. on Comp., May 1969, pp. 457–459.
K. Henderson, "Some Notes on the Walsh Functions," IEEE Trans. on El. Comp., Feb. 1964, pp. 50–52.

*Primary Examiner*—Malcolm A. Morrison
*Assistant Examiner*—David H. Malzahn
*Attorney*—Milton D. Bartlett, Joseph D. Pannone, Herbert W. Arnold and David M. Warren

[57] ABSTRACT

A transformation system for transforming a set of input data samples into a set of output transform components, the transformation being based on the use of a set of orthogonal digitally generated waveforms analogous to the use of sinusoids in a Fourier spectral analysis. The transformation is accomplished by sequentially storing, summing, and subtracting selected data samples and combinations thereof to effect a matrix multiplication of the set of input data samples.

10 Claims, 12 Drawing Figures

PATENTED JUN 26 1973 3,742,201

SHEET 1 OF 9

PATENTED JUN 26 1973

3,742,201

SHEET 5 OF 9

TRANSFORMER SYSTEM FOR ORTHOGONAL DIGITAL WAVEFORMS

BACKGROUND OF THE INVENTION

Spectral analysis techniques are commonly employed in the analysis of signals, such as radar and sonar signals, for measuring such signals and the identifying of a specific signal in the presence of other signals, such as the familiar problem of extracting a signal from a noise environment. Digital equipment is frequently employed to perform such an analysis since such equipment is inherently reliable, free of component drift such as that associated with analog filters, and readily contained in a package of relatively small physical size.

A problem arises in the digital implementation of signal analysis, particularly in the use of well known spectral techniques such as those employed with the fast Fourier transform. While the sinusoidal components of the Fourier analysis fit in naturally with analog filters, they lead to extensive mathematical operations in digital equipment, even with the so called faster transform operations such as the fast Fourier transform, with the result that such operations while occurring rapidly, are nevertheless incurred only at the expense of a rather substantial quantity of digital implementation.

SUMMARY OF THE INVENTION

In accordance with the invention there is provided an algorithm and computation means for implementing the algorithm to provide a set of output signal quantities composed of a combination of a set of input signal quantities and related to the set of input signal quantities by means of a matrix operation in which the individual input signals are associated with selected members of an array of multiplying factors so that the set of output signals represent a transformation of the set of input signals. By analogy with the use of sinusoidal waveforms as the basis of Fourier transformation, a set of orthogonal functions such as those based on the Walsh waveform or similar waveforms derived from a Reed-Muller code matrix are well suited for digital computers since the binary voltage waveforms of such computers has the same general form as the voltage waveform corresponding to a Reed-Muller code. Walsh functions may be utilized for analyzing the information carried by signals, such as those of radar or other communication systems, in a manner analogous to the utilization of sinusoids in a Fourier spectral analysis of signals. The Walsh transform is described in an article in the IEEE Transactions on Information Theory, Volume IT-14 No. 3 of May 1968, entitled "A Generalized Concept of Frequency and Some Applications" by Henning F. Harmuth. Utilization of the Walsh transform in lieu of the Fourier transform in signal processing operations is accomplished in a system in accordance with the invention which provides a transformation of signals into sets of Walsh transform components, or other suitable components if other orthogonal digital functions disclosed hereinafter are utilized. Such digital functions are furthermore advantageous in that they involve summations of a finite number of terms rather than the infinite number of terms of a Fourier integral which need be approximated by a summation of a finite number of terms in a digital computer operation. Such a system, capable of processing real-time data signals, has heretofore been unavailable.

The system of the invention implements the transformation of a signal into digital transform components by storing samples of the signal, extracting sequentially selected samples of the signal and combining these samples into a sequence of terms, each term being a sum or difference of a pair of selected signal samples. This procedure is then repeated with the sequence of terms providing a subsequence of terms each of which is a combination of four signal samples. The procedure is iterated until each term of a final sequence comprises each signal sample obtained within a predetermined sampling interval, each of these terms of the final sequence being one of the desired digital transform components. Means are also disclosed for indexing the terms of the final sequence to correlate each term with a specific transform component.

BRIEF DESCRIPTION OF THE DRAWINGS

The aforementioned advantages and other features of the invention are explained in the following description, taken in connection with the accompanying drawings wherein.

DESCRIPTION OF THE PREFERRED EMBODIMENT

Signals such as those used in communication systems may be analyzed by means of a succession of digital waveforms rather than the customary use of sinusoidal waveforms. Thus, by analogy with the use of a spectrum analyzer which provides the set of sinusoidal components characterized by amplitude and phase, it will be shown hereinafter that a signal may alternatively be described by a set of digital waveforms. And just as signals can also be synthesized by means of a set of sinusoidal components, so too can signals be synthesized by an appropriate set of digital waveforms. Furthermore, just as signals can be processed in the Fourier transform domain, as by filtering, for enhancement of the signal to noise ratio and the extraction of information, so too can signals be processed in a transform domain applicable to digital waveforms for enhancement of the signal to noise ratio and the extraction of information from the signals.

Figure 1:
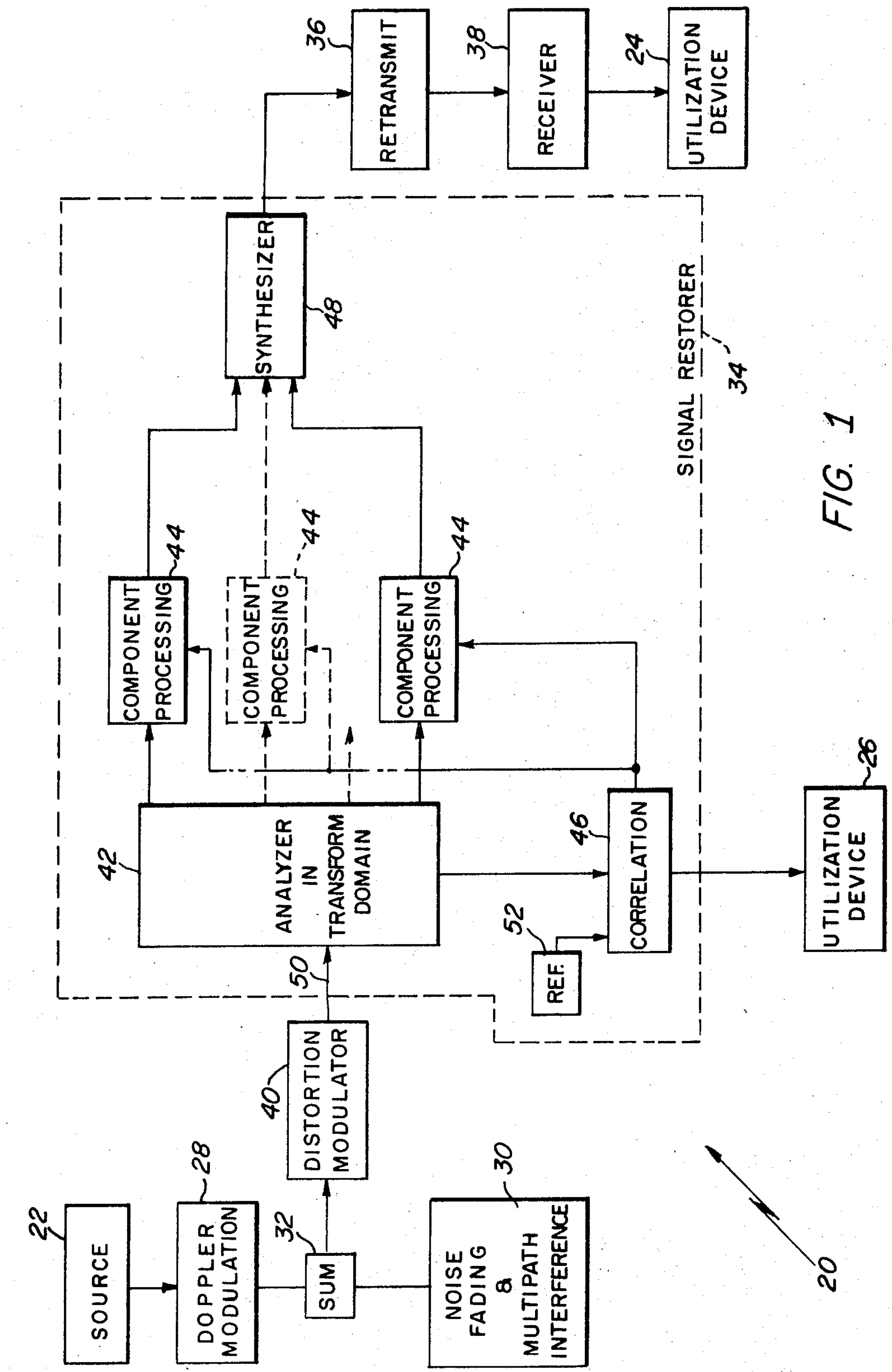
FIG. 1 is a generalized block diagram of a communications system suitable for utilization of the present invention.

Referring now to FIG. 1, there is shown a generalized block diagram of a communication system 20 in which a signal is conveyed from a source 22 to utilization devices 24 and 26. Signals are frequently modified by the mode of transmission and the medium; for example, a signal transmitted from a moving source, such as an aircraft, experiences a doppler shift. In addition, there are the effects of noise, fading, and multipath reflections from the ground. The doppler modulation of the signal is shown by way of modulator 28, and the effect of noise, fading and multipath interference is shown by way of an interference source 30. The disturbance provided by the interference source is combined with the doppler modulated signal in a summing network 32.

Frequently, signals which are transmitted over long distances require special processing en route by some means such as a signal restorer 34 which compensates for the deleterious effects of the transmission medium, whereupon the signal can be retransmitted by a transmitter 36 to be received by a receiver 38 for subsequent use in the utilization device 24. For example, in long distance telephony it is common practice to utilize repeater stations along the route which provides amplification and filtering to remove the effects of fading, noise and distortion. As is well known, distortion arises frequently because of a dispersive transmission medium which may be corrected, for example, by means of a filter having a compensating phase characteristic. The effect of distortion is indicated by modulator 40.

Signal restorer 34 is shown in a generalized fashion which is applicable to signal processing in any transform domain, whether it be a Fourier transform, a Bessel transform, or a Walsh transform. The signal restorer 34 comprises an analyzer 42, component processors 44, a correlator 46, and a synthesizer 48. The analyzer 42 is a device which provides a set of transform components corresponding to an interval of the input signal on line 50 of suitable length to be processed by the analyzer 42. For example, in the case of Fourier transform processing, the analyzer 42 comprises a bank of filters. In the case of transformation in the domain of digital waveform components such as, for example, a Walsh transformation, an analyzer appropriate to a Walsh transform, as will be described hereinafter, is utilized. Each of the transform components are then processed by a component processor 44 which, in the case of Fourier transform components, may comprise phase shifters for compensating the distortion induced by modulator 40 and amplifiers for compensating for the fading induced by the interference source 30. In the case of digital waveform transform components such as the Walsh transform, the component processors 44 have a form which will be described hereinafter. The transform components after processing by the component processors 44 are combined in the synthesizer 48 to provide a signal suitable for retransmission by transmitter 36.

Alternatively, the signal restorer 34 may utilize correlator 46 to correlate or compare the transformed replica of a signal on line 50 with a reference 52 having the transformation characteristics of the desired signal. The output of correlator 46 may be utilized directly by utilization device 26 for purposes such as noting the time of occurrence of the signal or for noting that a particular signal did in fact arrive as in the identification of a human voice, or alternatively, signals provided by the correlator 46 may be utilized to set the component processors 44 to modify the transform components so that they more closely resemble those of the reference 52. For example, in the case of a doppler radar utilizing Fourier transformation in which the output components from the analyzer 42 are sinusoids, the analyzer 42 will typically comprise a bandpass filter of suitable bandwidth to pass both the carrier frequency with its doppler frequency shift; and the correlator 46 may be a phase locked loop for tracking the carrier and providing suitable reference signals for tracking the component sinusoids in which case the component processors 44 would each comprise a mixer and filter whereby the mixer combines a transform component with a reference in the well known manner for providing an intermediate frequency signal free from doppler shift.

An analogous use of the correlator 46 applies to digital waveform transform components such as the Walsh transform. A description of the correlator 46 and the utilization device 26 as adapted for the Walsh transform will be presented hereinafter.

In order to facilitate the explanation of an analyzer such as the analyzer 42 which can provide transform components based on digital waveforms, some mathematical background will first be described.

Analog waveforms can be approximated as closely as desired by a set of suitably chosen digital waveforms, such a waveform having (apart from a scale factor) only one of two possible values at any instant of time. The waveforms representing binary numbers in a digital computer are an example of digital waveforms. For mathematical convenience in proving that a given set of digital waveforms when summed together does in fact represent a particular analog waveform, a set of digital waveforms which are orthonormal over a predetermined interval will now be utilized. Such a set of waveforms is the set of Walsh waveforms described in the article, cited hereinbefore, by Harmuth and the references cited therein.

The Walsh waveforms are described mathematically by the Walsh function $W_m(n;\theta)$ which is a solution to the difference equation $$W_m(2k+q,\theta) = W_m(-1)^{[k/2]+q}[k,2\theta+\tfrac{1}{2}] + (-1)^{k+q}W_m(k,2\theta-\tfrac{1}{2}) \qquad (1)$$

in which $$W_m(0,\theta) = 1 \;, -\tfrac{1}{2} \le \theta < +\tfrac{1}{2}$$

$$W_m(0,\theta) = 0 \;, \theta < -\tfrac{1}{2} \;, \theta \ge +\tfrac{1}{2}$$

$$q = 0,1 \;;\; k = 0,1,2, \ldots$$

$[k/2]$ means the largest integer $\le k/2$ and $W_m(n;\theta) = \pm 1$ (Walsh function has unit amplitude.)

This definition of the Walsh function applies to all values of time, $\theta$, over which the function exists.

Figure 3:
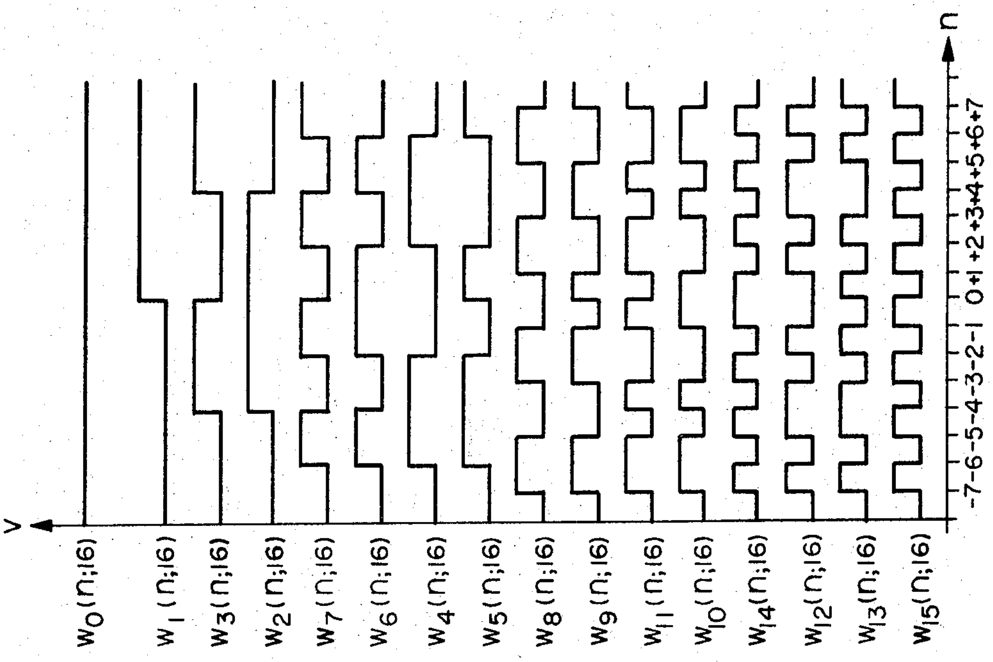
FIGS. 2 and 3 show, respectively, an 8-point and a 16-point interval with corresponding sets of Walsh waveforms.
Figure 2:
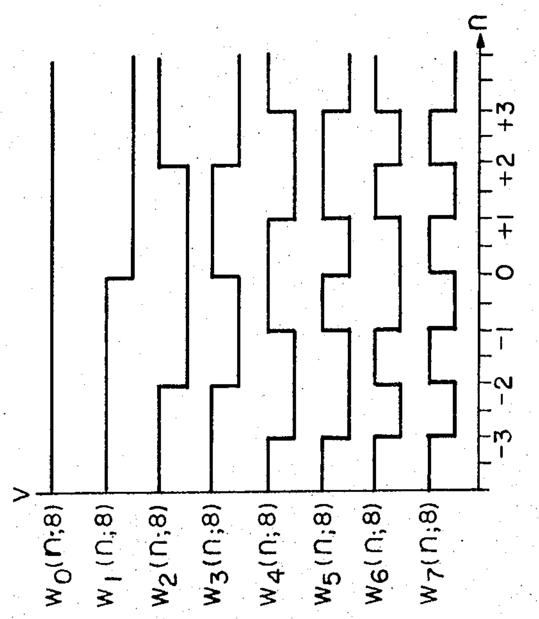

It is convenient to use the following expression for the Walsh function which is defined over a discretely sampled set of time values. Thus the Walsh function is defined in terms of the parameter $N$ where $N-1$ indicates the maximum number of zero crossings in the half open interval $-\tfrac{1}{2} \le \theta < +\tfrac{1}{2}$ and in terms of the parameter $m$ indicating the number of zero crossings of a particular waveform where $N = 2^m$ data points. The Walsh function is zero outside this interval. A set of waveforms corresponding to the Walsh function defined over an eight point, $N = 8$, interval is shown in FIG. 2; the waveforms for a sixteen point, $N = 16$, interval as shown in FIG. 3.

The Walsh function is orthonormal over the aforesaid interval for which it has been defined; thus, $$\sum_{n=0}^{N-1} w_m(n;\ N)\,w_k(n;\ N) = N\delta_{mk} \qquad (2)$$

where $\delta$ is the delta function; $\delta_{00}=1$, otherwise $\delta=0$. An orthogonal series representation for an analog waveform $f_n$ where n is an index representing a sequence of points along the time axis and n takes on values between 0 and $N-1$ is given by $$f_n = \frac{1}{N}\sum_{m=0}^{N-1}\left(\sum_{l=0}^{N-1} f_l w_m(l;\ N)\right) w_m(n;\ N) \qquad (3)$$

where l represents points on a discrete form of time axis;

$f_n$ is the magnitude of a data sample at point $n$ occurring at a time $t$;

and $$F_m = \sum_{l=0}^{N-1} f_l w_m(l;\ N) \qquad (4)$$

is the Walsh transform. The inverse Walsh transform is given by $$f_n = \frac{1}{N}\sum_{m=0}^{N-1} F_m w_m(n;\ N) \qquad (5)$$

The magnitudes of the components in the series expansion of Equation (4) are given by the matrix equation $$\begin{bmatrix} F_0 \\ F_1 \\ F_2 \\ F_3 \\ F_4 \\ F_5 \\ F_6 \\ F_7 \end{bmatrix} = \begin{bmatrix} +1 & +1 & +1 & +1 & +1 & +1 & +1 & +1 \\ +1 & +1 & +1 & +1 & -1 & -1 & -1 & -1 \\ +1 & +1 & -1 & -1 & -1 & -1 & +1 & +1 \\ +1 & +1 & -1 & -1 & +1 & +1 & -1 & -1 \\ +1 & -1 & -1 & +1 & +1 & -1 & -1 & +1 \\ +1 & -1 & -1 & +1 & -1 & +1 & +1 & -1 \\ +1 & -1 & +1 & -1 & -1 & +1 & -1 & +1 \\ +1 & -1 & +1 & -1 & +1 & -1 & +1 & -1 \end{bmatrix} \begin{bmatrix} f_0 \\ f_1 \\ f_2 \\ f_3 \\ f_4 \\ f_5 \\ f_6 \\ f_7 \end{bmatrix} \qquad (6)$$

in which the column matrix $$\underline{F} = \begin{bmatrix} F_0 \\ \cdot \\ \cdot \\ \cdot \\ F_{N-1} \end{bmatrix} \qquad (7)$$

represents the magnitudes of the components in the series expansion, and in which the column matrix $$\underline{f} = \begin{bmatrix} f_0 \\ \cdot \\ \cdot \\ \cdot \\ f_{N-1} \end{bmatrix} \qquad (8)$$

represents successive samples of the analog waveform $f_n$ taken over an interval of the analog waveform $-\frac{1}{2} \leq t < \frac{1}{2}$ in which the number of samples in the interval is equal to the order $N$ of the Walsh function.

Each row of the matrix $$B = \begin{bmatrix} +1 & +1 & \ldots & +1 \\ +1 & +1 & \ldots & -1 \\ \cdot & & & \\ \cdot & & & \\ \cdot & & & \\ +1 & -1 & \ldots & -1 \end{bmatrix} \qquad (9)$$

contains a succession of terms representing the value of a Walsh transform as a function of distance along the interval over which the waveform is defined. Thus, sets of Walsh waveforms defined over an 8 point interval and over a 16 point interval are shown respectively in FIGS. 2 and 3. Each waveform of the 8 point set, $N=8$, and the 16 point set, $N=16$, is identified by an index number m which may be referred to as the degree of the waveform. Equation (6) may be rewritten in simplified notation as $$F = Bf \qquad (10)$$

Figure 4:
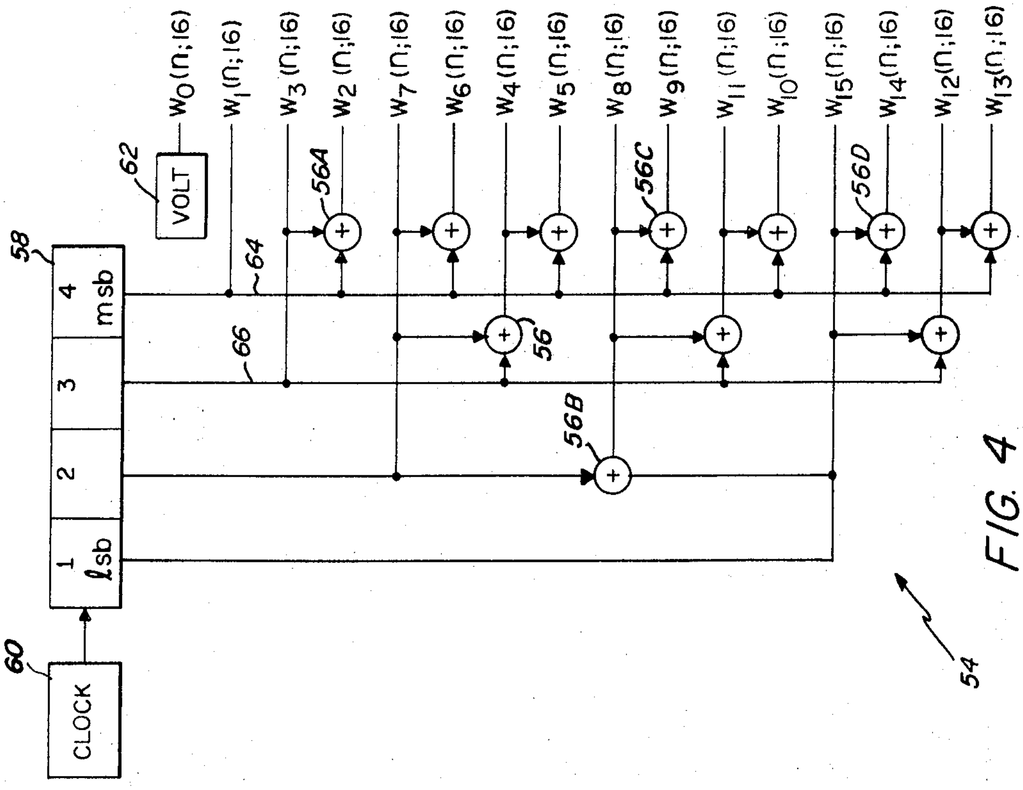
FIG. 4 shows a generator for generating Walsh waveforms.

Referring now to FIG. 4 there is shown a block diagram of a generator 54 which generates the set of 16 Walsh transform waveforms of FIG. 3. The generator 54 comprises a plurality of modulo-2 adders 56, some of which are designated 56A–D for ease of reference, and a four-stage binary counter 58. A four-stage binary counter is utilized since the Walsh transform waveforms to be generated are defined over a 16 point interval, the number of stages in the counter being equal to the number of bits in the interval. Thus, a three-stage counter would be used for an 8-point interval and a five-stage counter would be used for a 32 point interval over which the Walsh transform is defined. The binary counter 58 counts pulses from a clock 60 and reverts to a count of zero after reaching a count of 15, that is, the binary counter 58 is a modulo-16 counter. Each of the Walsh transform waveforms produced by the generator 54 are of order 16 since they are defined over a 16-point interval. The individual waveforms in this set are of degrees 0 through 15, the degree being indicated by the numerical subscript following the letter $w$. The first numeral in the parenthesis of the expression for each term of the Walsh transform, here represented by the letter $n$, is simply a running index analogous to time and designated a particular part of the interval, for example, it might represent the nth zero crossing. The second numeral in the parenthesis, shown as 16, represents the order of the Walsh transform.

The zero degree Walsh waveform is simply a DC level provided by a voltage source 62. The first degree Walsh waveform has only one zero crossing in the interval and is accordingly generated from the most significant bit, indicated by stage 4, of the binary couter 58. With reference to FIG. 3 it is noted that one zero crossing of the first degree Walsh waveform occurs at the center of the interval and the second zero crossing occurs at the right-hand end of the interval; however, as mentioned before the transform is defined over a half-open interval such that the right-hand end of point is not included within the interval. Thus, there is only one zero crossing of the first degree waveform in the interval.

The third degree waveform is generated from stage 3 of the binary counter 58, stage 3 being the next most significant bit. Stage 3 goes through two cycles for each single cycle of stage 4 and accordingly produces four crossings within the closed interval including the right-hand end point. However since the right-hand end point is not included within the half-open interval over which the transform is defined, there remains only three zero crossings as is seen in FIG. 3.

The second degree waveform is derived from stages 3 and 4 of the binary counter 58 in conjunction with a modulo—2 adder 56A as will now be described. The voltage appearing on line 64 is either of a high value or of a low value corresponding respectively to a 1 or a 0. Similarly, a 0 or a 1 appears on line 66. Referring momentarily to FIG. 3, it is seen that at the left hand end of the interval both the first and third degree Walsh waveforms are of a low voltage corresponding to a 0. 0 plus 0 applied to the adder 56A provides an output of 0, or equivalently a low voltage as is indicated at the corresponding portion of the second degree waveform. Further to the right at $n$=4, the third degree waveform changes to a 1 so that the signal on line 66 is a 1 while the signal on line 44 is still a 0. Accordingly, the output of the adder 56A is now a 1 as is indicated at the point $N$=4 on the second degree Walsh waveform. At $n$=8 the first degree waveform jumps to a 1 while the third degree waveform jumps to a 0 so that there is still applied to the adder 56A a 0 and a 1 and the output of the adder 56A accordingly remains at the value 1. Thus at the point $n$=8 the second degree waveform retains its high voltage or value of 1. Further on in the interval at the point $n$=12 the value of the third degree waveform changes to a 1 while the value of the first degree waveform remains at 1. Thus, there is now a 1 on line 64 and a 1 on line 66 which are applied to the adder 56A. Accordingly, the adder 56A now produces an output which is a 0 due to the fact that the adder 56A is a modulo–2 adder. Accordingly, as seen in FIG. 3, the voltage of the second degree waveform drops to a low value or a 0 with the results that there are two zero crossings per interval. By following the same procedure it is readily seen that all 16 waveforms can be produced by the generator 58.

In accordance with the invention, an algorithm for computing the Walsh transform is derived as follows: Let $x_{n,m}$ be the contents of the $n^{th}$ data slot on the $m^{th}$ iteration. Then $$x_{n,m+1} = x_{n,m} + x_{n+2^{M-m},m} \tag{11}$$

$$x_{n+2^{M-m},m+1} = x_{n,m} - x_{n+2^{M-m},m} \tag{12}$$

$$n = 0, 1, \ldots, 2^{M-m}-1, 2^{2(M-m)}, 2^{2(M-m)}+1, \ldots, \text{etc.} \tag{13}$$

where $N = 2^M$ $x_{n;0}$ is the data input (14)

$$x_{n,m} = \sum_{n=0}^{N-1} x_{n,0} W_m(n; N)$$

Examination of the algorithm shows that $N$ additions are done on each iteration. Since only $M$ iterations are required to accomplish the entire calculation, the total number of adds is given by $$MN = N \log_2 N. \tag{15}$$

By way of comparison, if Equation (4) is used to compute the $N$ Walsh coefficients $x_m$, it is seen that $N$ adds must be taken for each $m$, which means that the overall process requires $N^2$ adds. Accordingly, this algorithm is referred to as the Fast Walsh transform.

As an example, the algorithm is applied to the case of an interval having 8 data points, $N$=8. Let the eight data samples be represented by $a_0, a_1, \ldots, a_7$. It will be assumed that they are located sequentially in 8 locations:

The particular locations are conveniently labeled $x_{kq}$ where the subscript $k$ designates the location and the subscript $q$ designates the iteration. Thus $q$=0 at the beginning and $q$=1 at the completion of the first stage in the arithmetic operations. Accordingly, the data samples are located at:

$$\begin{aligned} x_{0,0} &= a_0 & x_{4,0} &= a_4 \\ x_{1,0} &= a_1 & x_{5,0} &= a_5 \\ x_{2,0} &= a_2 & x_{6,0} &= a_6 \\ x_{3,0} &= a_3 & x_{7,0} &= a_7 \end{aligned} \tag{16}$$

Then after the first iteration the following quantities are stored in the 8 consecutive locations:

$$\begin{aligned} x_{0,1} &= a_0+a_4 & x_{4,1} &= a_0-a_4 \\ x_{1,1} &= a_1+a_5 & x_{5,1} &= a_1-a_5 \\ x_{2,1} &= a_2+a_6 & x_{6,1} &= a_2-a_6 \\ x_{3,1} &= a_3+a_7 & x_{7,1} &= a_3-a_7 \end{aligned} \tag{17}$$

After the second iteration these quantities appear:

$$\begin{aligned} x_{0,2} &= a_0+a_4+a_2+a_6 & x_{4,2} &= a_0-a_4+(a_2-a_6) \\ x_{1,2} &= a_1+a_5+a_3+a_7 & x_{5,2} &= a_1-a_5+(a_3-a_7) \\ x_{2,2} &= a_0+a_4-(a_2+a_6) & x_{6,2} &= a_0-a_4-(a_2-a_6) \\ x_{3,2} &= (a_1+a_5)-(a_3+a_7) & x_{7,2} &= a_1-a_5-(a_3-a_7) \end{aligned} \tag{18}$$

and finally on the third iteration:

$$\begin{aligned} x_{0,3} &= a_0+a_4+a_2+a_6+a_1+a_5+a_3+a_7 \\ x_{1,3} &= a_0+a_4+a_2+a_6-a_1-a_5-a_3-a_7 \\ x_{2,3} &= a_0+a_4-(a_2+a_6)+a_1+a_5-(a_3+a_7) \\ x_{6,3} &= a_0-a_1-(a_2-a_6)+a_1-a_5-(a_3-a_7) \\ x_{3,3} &= a_0+a_4-(a_2+a_6)-(a_1+a_5-(a_3+a_7)) \\ x_{7,3} &= a_0-a_4-(a_2-a_6)-(a_1-a_5-a_3+a_7) \\ x_{4,3} &= a_0-a_4+(a_2-a_6)+a_1-a_5+(a_3-a_7) \\ x_{5,3} &= a_0-a_4+(a_2-a_6)-(a_1+a_5+a_3-a_7) \end{aligned} \tag{19}$$

Rearranging the terms in the order of the original sequence of data samples, the 8 functions are:

$$\begin{aligned} x_{0,3} &= a_0+a_1+a_2+a_3+a_4+a_5+a_5+a_6+a_7 \\ x_{1,3} &= a_0-a_1+a_2-a_3+a_4-a_5+a_6-a_7 \\ x_{2,3} &= a_0+a_1-a_2-a_3+a_4+a_5-a_6+a_7 \\ x_{3,3} &= a_0-a_1-a_2+a_3+a_4-a_5-a_6+a_7 \\ x_{4,3} &= a_0+a_1+a_2+a_3-a_4-a_5-a_6-a_7 \\ x_{5,3} &= a_0-a_1+a_2-a_3-a_4+a_5-a_6+a_7 \\ x_{6,3} &= a_0+a_1-a_2-a_3-a_4-a_5+a_6+a_7 \\ x_{7,3} &= a_0-a_1-a_2+a_3-a_4+a_5+a_6-a_7 \end{aligned} \tag{20}$$

Writing out just the signs of the data samples yields the values tabulated in Table I.

TABLE I

| K/$n$ | 0 | 1 | 2 | 3 | 4 | 5 | 6 | 7 | $m$ |
|---|---|---|---|---|---|---|---|---|---|
| 0 | +1 | +1 | +1 | +1 | +1 | +1 | +1 | +1 | 0 |
| 1 | +1 | −1 | +1 | −1 | +1 | −1 | +1 | −1 | 7 |
| 2 | +1 | +1 | −1 | −1 | +1 | +1 | −1 | +1 | 3 |
| 3 | +1 | −1 | −1 | +1 | +1 | −1 | −1 | +1 | 4 |
| 4 | +1 | +1 | +1 | +1 | −1 | −1 | −1 | −1 | 1 |
| 5 | +1 | −1 | +1 | −1 | −1 | +1 | −1 | +1 | 6 |
| 6 | +1 | +1 | −1 | −1 | −1 | −1 | +1 | +1 | 2 |
| 7 | +1 | −1 | −1 | +1 | −1 | +1 | +1 | −1 | 5 |

where $n$ = data sample number in time (or the point in the interval where the sample was taken)

$K$ = location in storage

It is readily seen by inspection that the array in Table I is the same as the matrix B of Equations 6 and 10, and furthermore, that each now is a Walsh function. For example, a plot of voltage waveforms representing binary states in the table is seen to have the same forms as the waveforms of FIG. 2. In the right hand column, *m* represents the number (or degree) of the Walsh function. This proves the algorithm.

Figure 5:
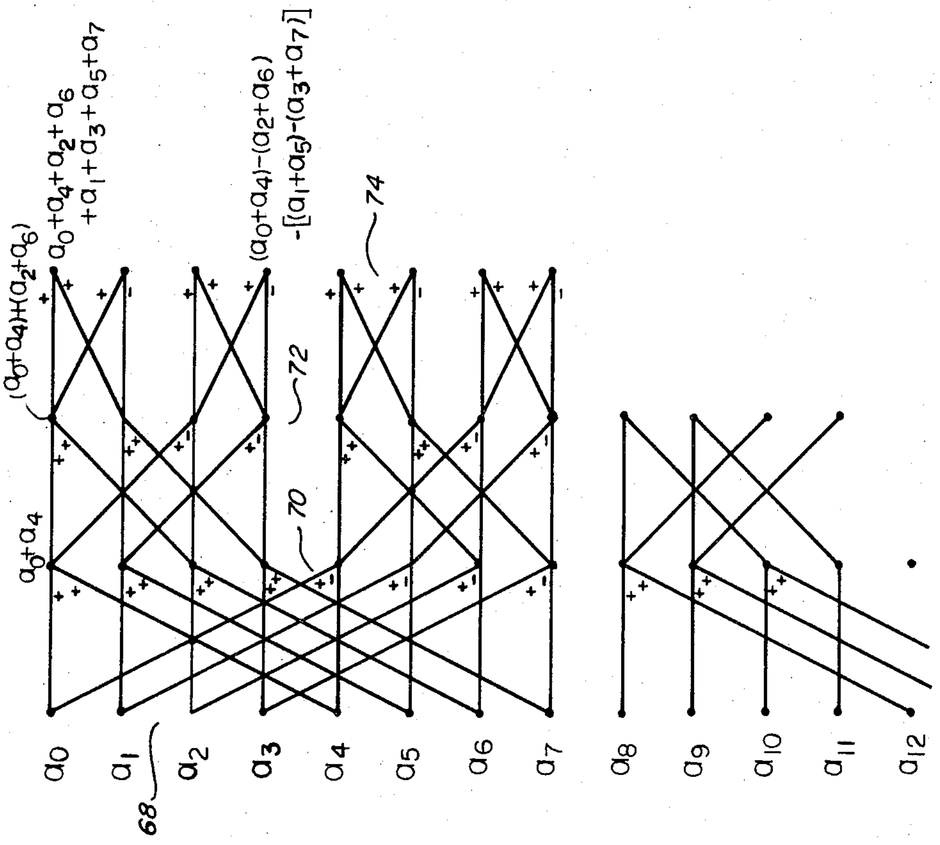
FIG. 5 is a flow graph of the Walsh transform algorithm of the invention.

A flow graph of the algorithm for an eight point interval is shown in FIG. 5. 13 locations $x_0$–$x_{12}$ and 13 data samples $a_0$–$a_{12}$ are shown. The data samples $a_0$–$a_7$ comprise one 8-point interval. A second 8-point interval comprising data samples $a_8$–$a_{15}$ is partially shown by the data samples $a_8$–$a_{12}$. The first, second, third and forth sets (columnar arrays) of points 68, 70, 72 and 74 represent respectively Equations 16–19.

Figure 6:
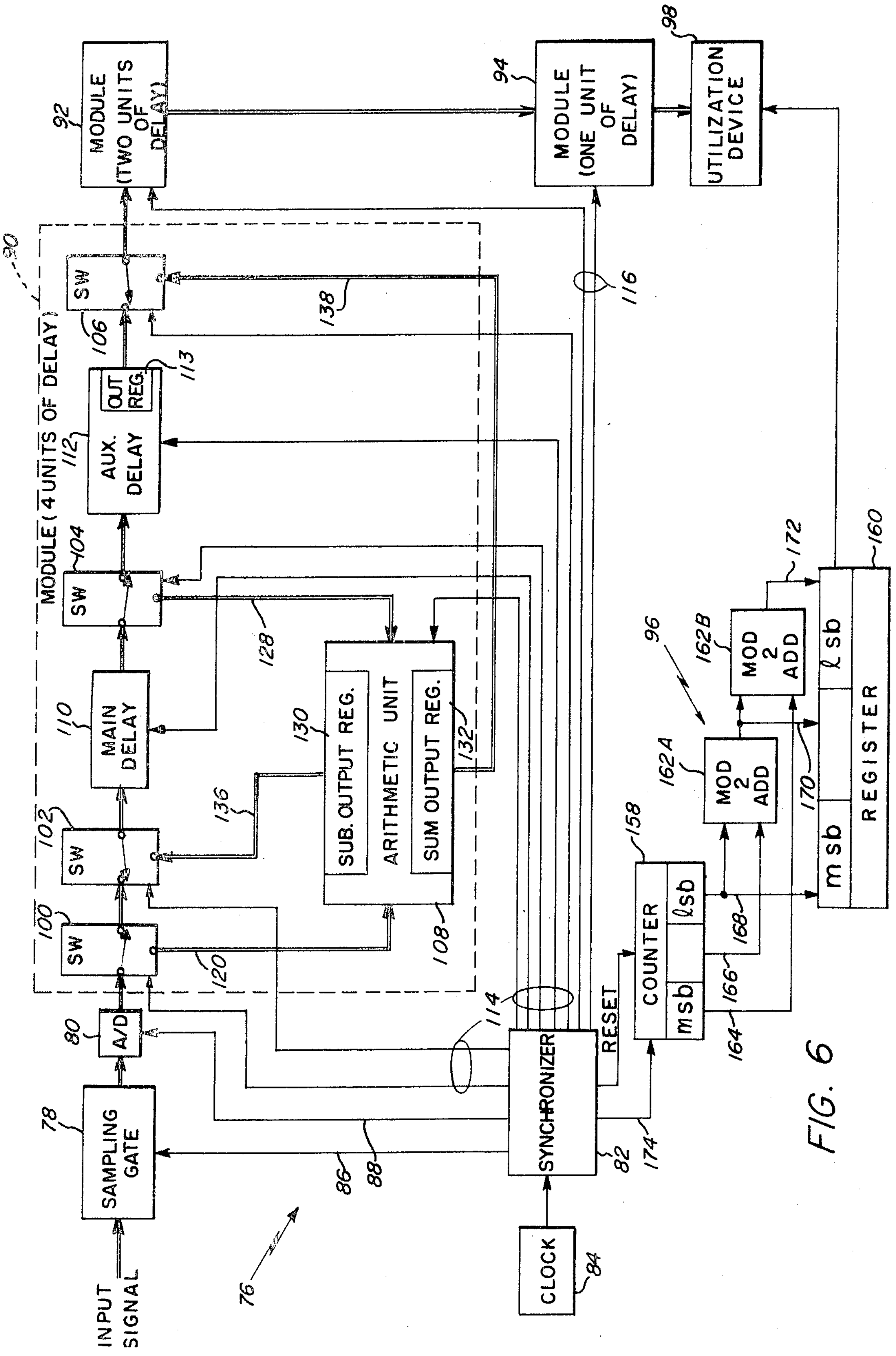
FIG. 6 is a block diagram of a Walsh transformer of the invention.

Referring now to FIG. 6, there is shown a block diagram of the transformer 76 suitable for use in the communications system of FIG. 1 to serve as the analyzer 42 for transforming an input analog signal into a set of the corresponding Walsh transform components. The transformer 76 comprises a sampling gate 78 and an analog-to-digital converter, hereinafter referred to as A/D 80, which respectively sample the input signal, or data, and convert the magnitudes of the various data samples to digital numbers representing these magnitudes. The sampling is done repetitively, preferably periodically. A well-known synchronizer 82 driven by pulses from a clock 84 provides control signals along lines 86 and 88 respectively to the sampling gate 78 and the A/D 80 for coordinating their operation such that the A/D 80 is activated for each sample of the sampling gate 78. The transformer 76 further comprises three modules 90, 92 and 94 which provide sequentially at the output of module 94 the various Walsh components, and an indexer 96 for supplying the degree or index numeral for each of the Walsh transform components. As seen in Table I, particularly the right-hand column giving the number or degree of the Walsh transform component as indicated by the letter *m*, the transform components are produced in a scrambled order so that it is necessary for the indexer 96 to apportion the various *m* numbers such that the various transform components are correlated with the data samples of Equation 16. Each of the modules 90, 92, and 94 include means for performing the arithmetic operations shown respectively by Equations 17, 18 and 19; the term module is meant to include the means for performing the arithmetic operations and is intended to include such means whether they be located physically close together as in a microminiature circuit module or located in a spaced apart configuration with substantial distances between them. The output of module 94 and the indexer 96 connect with a utilization device 98 which may be, for example, the component processors 44 of FIG. 1 or the correlator 46 of FIG. 1.

The module 90 comprises four switches 100, 102, 104 and 106, and arithmetic unit 108, a main delay 110 and an auxiliary delay 112 having an output register 113. Control signal for coordinating the operation of each one of these components of the module 90 are supplied by the synchronizer 82 along control lines 114.

The modules 92 and 94 are essentially the same as the module 90 except that, with respect to their main delays, the amounts of delay differ from that of the main delay 110 of module 90. In module 92 the main delay provides a delay equal to one-half that of the main delay 110 and in module 94 the main delay provides a delay equal to one-quarter that of the main delay 110 of module 90. Control signals for coordinating the operations of the modules 92 and 94 with that of module 90, as well as the coordination of the individual components of the modules 92 and 94 provided by the synchronizer 82 via cables 116. To facilitate the explanation of the transformer 76, heavy lines are utilized to show the flow of digital numbers between its various components while light lines are utilized to show the interconnections for the control signal of the synchronizer 82.

Figure 7A:
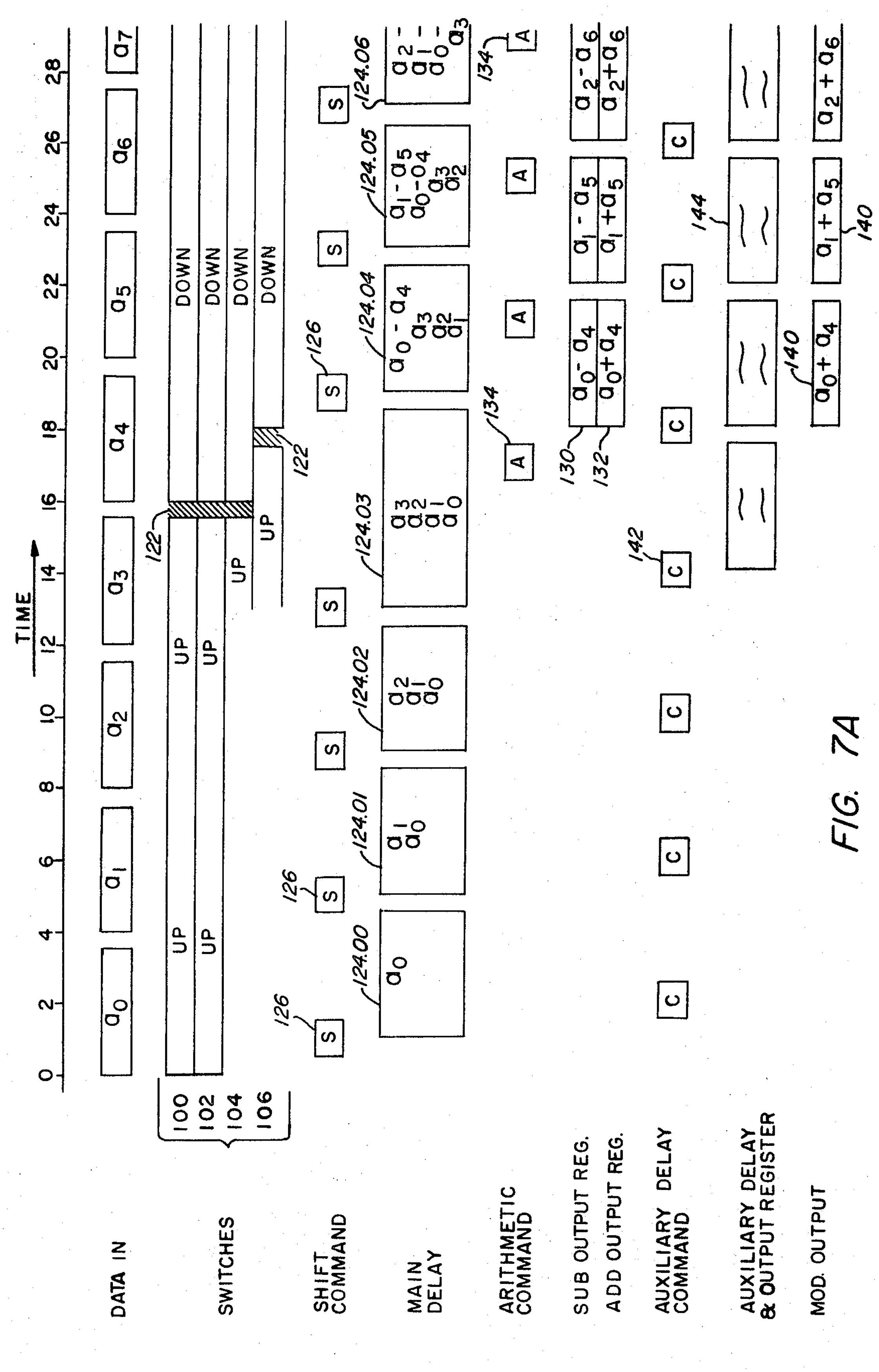
FIGS. 7A and 7B taken together are a timing diagram of the operation of the Walsh transformer of FIG. 6.
Figure 7B:
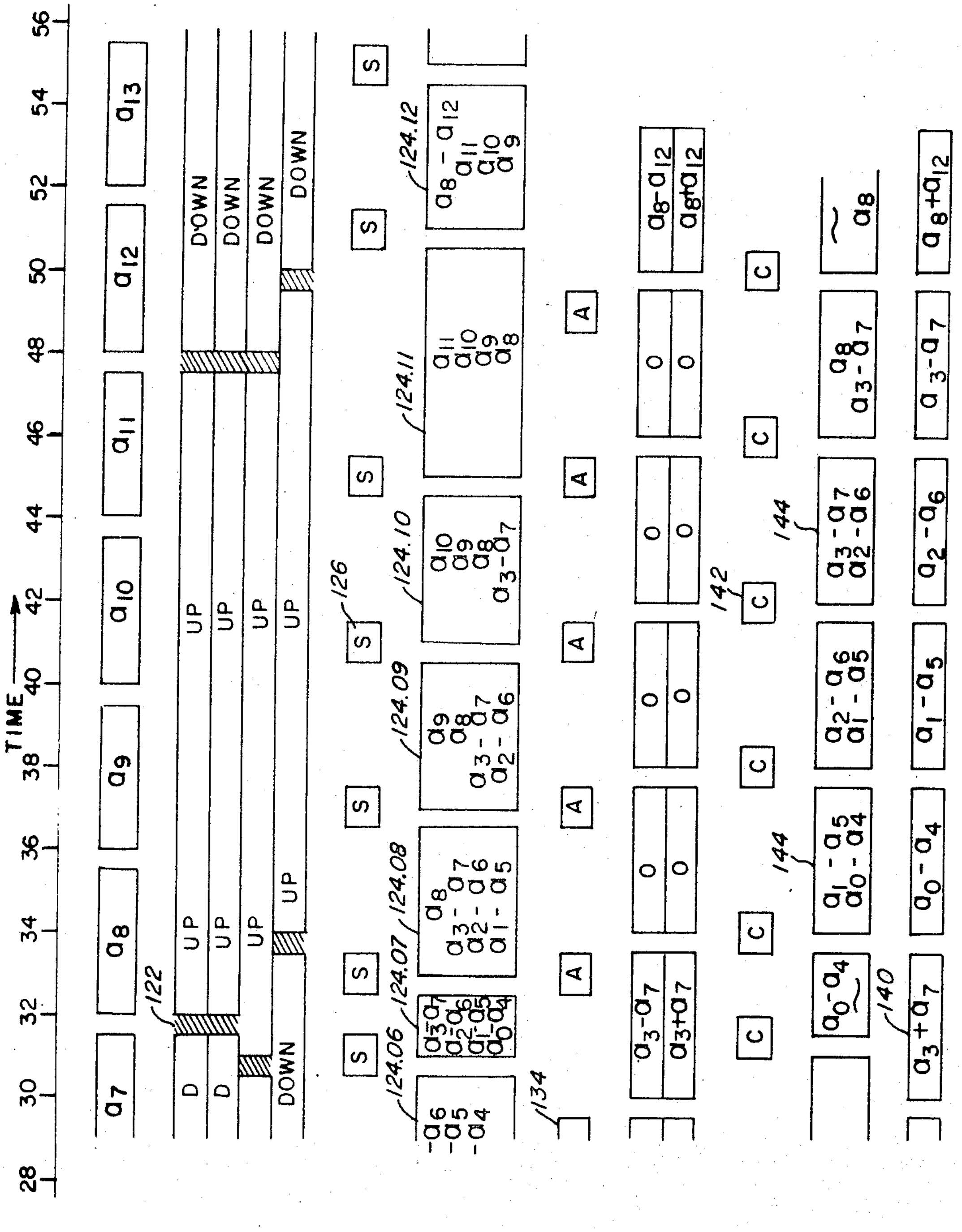

Referring now to FIGS. 6, 7A and 7B the data samples $a_0$–$a_{12}$ correspond to the data samples $a_0$–$a_{12}$ of the flow graph in FIG. 5. Also, the data samples $a_0$ –$a_7$ are the same data samples appearing in the Equations 16–19. The module 90 operates as follows. Digital numbers representing the signed magnitude of each of the data samples are applied by A/D 80 to the switch 100 which directs the digital numbers either along line 118 or line 120 depending on whether the switch is UP or DOWN. The timing diagram of FIGS. 7A and 7B shows when the switch 100 is UP and when the switch is DOWN. Switch 100 is seen to be UP during the times of recurrence of the data samples, $a_0$, $a_1$, $a_2$ and $a_3$. The switch 100 is DOWN during the occurrences of the data samples $a_4$ . . . $a_7$, UP during the data samples $a_8$ . . . $a_{11}$, DOWN for the next four data samples and continuing periodically in this manner. The spacings 122 in the chart of the switch positions indicate small intervals of time when the switches are changing from the UP state to the DOWN state or from the DOWN state to the UP state. Similarly, switch 102 is seen to be UP when switch 100 is UP and DOWN when switch 100 is DOWN. Switch 104 changes from UP to DOWN in synchronism with the switches 100 and 102, however, switch 104 changes from DOWN to UP one time unit earlier than do switches 100 and 102. Switch 106 switches from UP to DOWN 2 time units after the switching of switch 100, and switches from DOWN to UP two time units after the switching of switch 100.

The time units indicated on the graphs of FIGS. 7A and 7B may be seconds, milliseconds, or microseconds. In practice, a data sample such as the data sample $a_0$ has a duration of on the order of microseconds, however, to facilitate the explanation of the operation, it is convenient to assume that each time unit is 1 second. Thus, each data sample persists for 3 ½ seconds with a ½ second interval between data samples during which time the A/D 80 updates the digital number which it provides for switch 100. The spacings 122 are similarly of one-half second duration.

During the first 11 ½ seconds of the interval the data samples $a_0$ . . . $a_3$ are sequentially entering the main delay 110. The main delay 110 may be implemented by any suitable means such as a memory or storage unit or an acoustic delay line, or as is done in the preferred embodiment of FIG. 6 by means of a shift register.

The shift register of the main delay 110 has four cells or spaces for digital numbers, there being four cells because this embodiment is processing data in 8 point intervals. The shift registers of the main delay 110 and the module 90 are indicated diagramatically on the timing diagram of FIG. 7A and 7B by means of blocks 124 individually identified by decimals 124.00–124.13. The first four blocks 124.00–124.03 contain the symbols $a_0$ . . . $a_3$ and show diagramatically how the data samples $a_0$ . . . $a_3$ are entered sequentially into their respective cells in the shift register of the main delay 110. In block 124.00 the term $a_0$ is shown in the first cell. In block 124.01 the term $a_0$ is shown shifted to the second cell and the term $a_1$ has entered into the first cell. Similar comments apply to block 124.02 and also to block 124.03 wherein it is shown that the first data sample to enter the main delay 110, namely $a_0$, has been shifted all the way to the fourth cell, the term $a_1$ has been shifted to the third cell, the term $a_2$ has been shifted to the second cell, and the term $a_3$ has just entered the first cell of the main delay 110. In order to implement the shifting of the data through the cells of the shift register of the main delay 110, as well as to enter new data into the first cell of the shift register of the main delay 110, a command signal in the form of a shift pulse is provided by the synchronizer 82 along a control line 114. With each of the shift pulse signals, indicated diagramatically on the timing diagram by the blocks 126 the remaining delay 110 performs the operation of shifting the data of one cell and entering a new quantity into the first cell. As shown in the timing diagram the blocks 126 occur somewhat earlier than do the blocks 124 since some time is required for the main delay 110 to operate.

At the time of 16 seconds the switch 100 is switched to the DOWN position so that data samples from the A/D 80, namely, the data samples $a_4$ . . . $a_7$ are made available to the arithmetic unit 108. Also, at the time of 16 seconds the switch 104 switches to the DOWN state so that quantities stored in the fourth cell of the main delay 110 are made available to the arithmetic unit 108 along line 128. The arithmetic unit 108 performs arithmetic operations which provide both the sum and the difference of the quantities appearing on the lines 120 and 128. The difference between these two quantities appears in the subtraction output register 130, and the sum of these two quantities appears in the sum output register 132.

A short time after switches 100 and 104 switch to the DOWN position, for example, ½ second as shown in the timing diagram of FIGS. 7A and 7B, a command signal for the arithmetic unit 108 indicated by a block 134 is provided along a control line 114 to activate the arithmetic unit 108 to perform the arithmetic operations. The arithmetic unit 108 then begins its operation and after a delay of, for example, 1½ seconds shown in the timing diagram, the difference of the two quantities on the lines 120 and 128 appears in the subtractor output register 130 and the sum of the new quantities on lines 120 and 128 appear in the sum output register 132. The quantity appearing in the subtraction output register 130 is made available to the main delay 110 via a line 136 and switch 102 which also switches to the DOWN state at the time of 16 seconds. The quantity appearing in the sum output register 132 is made available to the module 92 via line 138 and switch 106 which switches to the DOWN state at the time when the quantities first appear in the output registers 130 and 132, namely at the time of 18 seconds.

As seen in the timing diagram the quantity appearing in the subtraction output register 130 is a $a_0$ . . . $a_4$, the term $a_0$ being obtained by the arithmetic unit 108 from the fourth cell of the main delay 110 along line 128, and the term $a_4$ being obtained from the A/D 80 via line 120. As seen in the timing diagram the sum of these two terms, namely, $(a_0+a_4)$ appears in the sum output register 132. Also shown in the timing diagram is the output of the module 90 shown as block 140 with the legend $a_0+a_4$ contained therein.

At the time of 18 ½ seconds a block 126 on the timing diagram indicates the application of a control signal to the main delay 110 to enter a new quantity in the first cell, and to shift the quantities in the other cells thereby discarding the term $a_0$ which was contained in the fourth cell. Thus, as shown in the timing diagram the main delay 110 now contains the quantities $a_0-a_4$, $a_3$, $a_2$ and $a_1$ respectively in the first, second, third and fourth cells of the main delay 110. The term $(a_0-a_4)$ is entered into the main delay 110 from the subtraction output register 130 via the switch 102.

At a time of 20½ seconds a block 134 on the timing diagram indicates the initiation of an arithmetic operation involving the term now in the fourth cell of the main delay 110, namely the term $a_1$, and the quantity arriving on line 120, namely the term $a_5$. As shown in the timing diagram both the terms $a_1$ and $a_5$ are present at the time when block 134 appears. The quantities in the output registers 130 and 132 are discarded at a time of 21 ½ seconds which by way of example is one-half second before the new quantities, namely the quantity $a_1-a_5$, and the quantity $a_1+a_5$ appear respectively in the subtraction output register 130 and the sum output register 132. Also shown in the timing diagram is a block 140 indicating the quantity which is made avilable from a time of 22 seconds until a time of 25 ½ seconds to the module 92, namely, the quantity $a_1+a_5$ appearing in the sum output register 132.

The operation continues with successive shifting of the quantities within the main delay 110 and successive computation by the arithmetic unit 108 in response to respectively the commands indicated by blocks 126 and 134. At a time of 30 ½ seconds switch 104 terminates its DOWN state and after a switching time of ½ second begins the UP state. This initiates the next phase of the algorithm in which the difference quantities provided by the subtraction output register 130 and stored in the main delay 110 are now made available at the output of module 90. As a first step to implementing the transferal of the difference quantities $a_0-a_4$, $a_1-a_5$, $a_2-a_6$ and $a_3-a_7$, in that order, sequentially to module 92, these difference quantities are first passed through the auxiliary delay 112 which as may be seen from the timing diagram has one cell plus the output register 113. Quantities appearing in the output register 113 are available for entry into the module 92. The aforementioned switching of switch 104 to the UP state at a time of 31 seconds provides a connection between the main delay 110 and the auxiliary delay 112 whereby a quantity in the fourth cell of the main delay 110 can be entered into the cell of the auxiliary delay 112 upon command of a control signal from the synchronizer 82 along a control line 114, such control signals being indicated on the timing diagram by blocks 142. A block 142 is shown at a time of 31 seconds, and one-half second later a block 144 representing the contents of the auxiliary delay 112 is shown with an entry of the quantity $(a_0-a_4)$ in the first cell of auxiliary delay 112.

At the time of 32 seconds switches 100 and 102 switch to the UP state thereby again providing data samples from the A/D 80 directly to the main delay 110. At this point there are no longer any signals traveling along lines 120 and 128 to the arithmetic unit 108 so that the output registers 130 and 134 both show zero as is indicated on the timing diagram. In response to the occurrence of the next control pulse to the main delay 110, as indicated by the block 126, at the time of 32 ½ seconds the main delay 110 discards the quantity $(a_0-a_4)$ which was in the fourth cell, shifts the other quantities and enters a new data sample $a_8$ into the first cell. It is noted that at this point the blocks 126 are not occurring at a regular repetition rate; the block 126 occurring at 32 ½ seconds being advanced in time to permit a uniform output data rate as is indicated by the module output blocks 140 in view of the fact that the arithmetic unit 108 is now temporarily switched out of the loop. At the time of 33 ½ seconds the switch 106 terminates its DOWN state thereby completing the disconnection of the arithmetic unit 108 from the other components of the module 90, and after a switching time of, for example, ½ second, as shown in the timing diagram, the switch 106 switches to the UP state thereby connecting the module output to the auxiliary delay 112. At the time of 33 ½ seconds a command signal indicated by block 142 initiates a shifting of the quantity in the auxiliary delay 112 so that the quantity $(a_1-a_5)$ in the fourth cell of the main delay 110 now also appears in the first cell of the auxiliary delay 112 as indicated by block 144 on the timing diagram. The quantity $a_0-a_4$ appears in the second cell of auxiliary delay 144 and is thus available to the module 92 as is indicated by the module output block 140. The auxiliary delay 112 may be a shift register as is used for the main delay 110, only having one-half the number of cells, (the latter being the output register 113) this being the same number of cells as is utilized in the main delay of the module 92.

It is readily verified by inspection of the timing diagram that the module 90 is operating in a periodic fashion with the data samples $a_8-a_{11}$ being processed in the same manner as were the data samples $a_0-a_3$. As the data samples $a_8-a_{11}$ are entered sequentially into the main delay 110, the difference quantities $a_1-a_4$, $a_1-a_5$, $a_2-a_6$, and $a_3-a_7$ sequentially enter the auxiliary delay 112 as indicated by blocks 144 on the timing diagram. Thus it is seen that the difference quantity $(a_0-a_4)$ appears in the output register 113 in block 144 and in the module output represented by a block 140 for a duration of 3 ½ seconds occurring ½ second after the sum quantity $(a_3+a_7)$, also seen in a block 140 for a duration of 3 ½ seconds.

At the time of 48 seconds the same transition occurs in the operation of the module as occurred at the time 16 seconds, namely switches 100, 102, and 104 switch to the DOWN state and a second later the arithmetic unit 108 is activated to start combining the quantities applied by the switches 100 and 104. It is also noted that the block 126 representing the control signal for the main delay 110 occuring at a time of 50 ½ seconds is delayed from the occurrence of the preceding block 126 in the same manner that the block which occurred at 18 ½ seconds was delayed from the occurrence of the block occurring at 12 ½ seconds. This delay permits coordination of the operation of the arithmetic unit 108 and the deletion of the auxiliary delay 112 from the output circuit since the output quantities, namely, the sum terms such as the quantity $(a_8+a_{12})$, now by-pass the auxiliary delay 112 along line 138 directly from the sum output register 132. It is also noted that successive applications of the control signal for the auxiliary delay 112, indicated by the blocks 142 cause the two cells of the auxiliary delay 112 to be cleared out, for example, the clearing of the term $a_8$ occurring while the auxiliary delay 112 is by-passed.

The module 92 is the same form as the module 90, as has been mentioned before with the exception that the main delay has two cells rather than the four cells of the main delay 110 of module 90. Accordingly, a timing diagram such as that shown in FIGS. 7A and 7B applicable to the module 92 would show a cyclical operation in which the switches 100, 102, 104 and 106 would switch state once during the occurrence of every two data samples while in the module 90, as shown in FIGS. 7A and 7B, the switches switch state once during the occurrence of four data samples. The same comments apply to module 94 except that here the main delay has only one cell and the switches 100, 102, 104 and 106 switch once during the occurrence of each data sample. At the time of 2 seconds the switches 100 and 102 of the module 92 are switched to the UP state, the delay of 2 seconds relative to the timing of FIGS. 7A and 7B being due to the fact that the first quantity relative to the sampling interval, namely $(a_0+a_4)$, and is delayed from the occurrence of the input data sample $a_4$. And similarly, the switches 100 and 102 of the module 94 are delayed an additional 2 seconds after the corresponding switches of the module 92 so that the switches 100 and 102 of the module 94 switch to the UP state at a time of 4 seconds. In all three modules, 90, 92 and 94, the switching of switch 104 to the UP state is advanced by 1 second relative to the switching of switch 100. Similarly, in all three modules the switching of switch 106 both to the UP state and to the DOWN states is delayed by 2 seconds relative to the switching of switch 100. Thus, for example in the operation of module 92 the first two quantities to enter the module are the quantities $(a_0+a_4)$ and $(a_1+a_5)$, both of these quantities entering the main delay 110. The next two quantities entering the module 92 are the quantities $a_2+a_6$ and $a_3+a_7$, both of these quantities entering directly into the arithmetic unit. At the time when the quantity $a_2+a_6$ enters the arithmetic unit, the sum and difference terms are produced, namely, $(a_0+a_4+a_2+a_6)$ and $(a_0a_4)-(a_2+a_6)$. At the time when quantity $(a_3+a_7)$ enters the arithmetic unit 108 a sum and difference term is produced, namely, $(a_1+a_5+a_3+a_7)$ and $(a_1+a_5)-(a_3+a_7)$. The sum terms go directly to the module 94 and the difference terms then proceed by the auxiliary delay 112 to the module 94. Similar operational comments apply to the module 94. A diagrammatic representation of the various computations and the times when they are available for a succeeding module, or utilization device is shown in a modified flow chart in FIG. 8 which is derived from FIG. 5 by displacing points along the time axis so that the instant of time of each computation is readily ascertained. In addition, the command signals represented by the blocks 126, 134 and 142 are delayed by 2 seconds relative to the time shown in the timing diagram in FIG. 7A and 7B in the case of module 92 and by 4 seconds in the case of module 94. It is also evident that module 92 completes two cycles of operations for every single cycle of module 90, and that module 94 completes four cycles of operation for each cycle of module 90.

Figure 8:
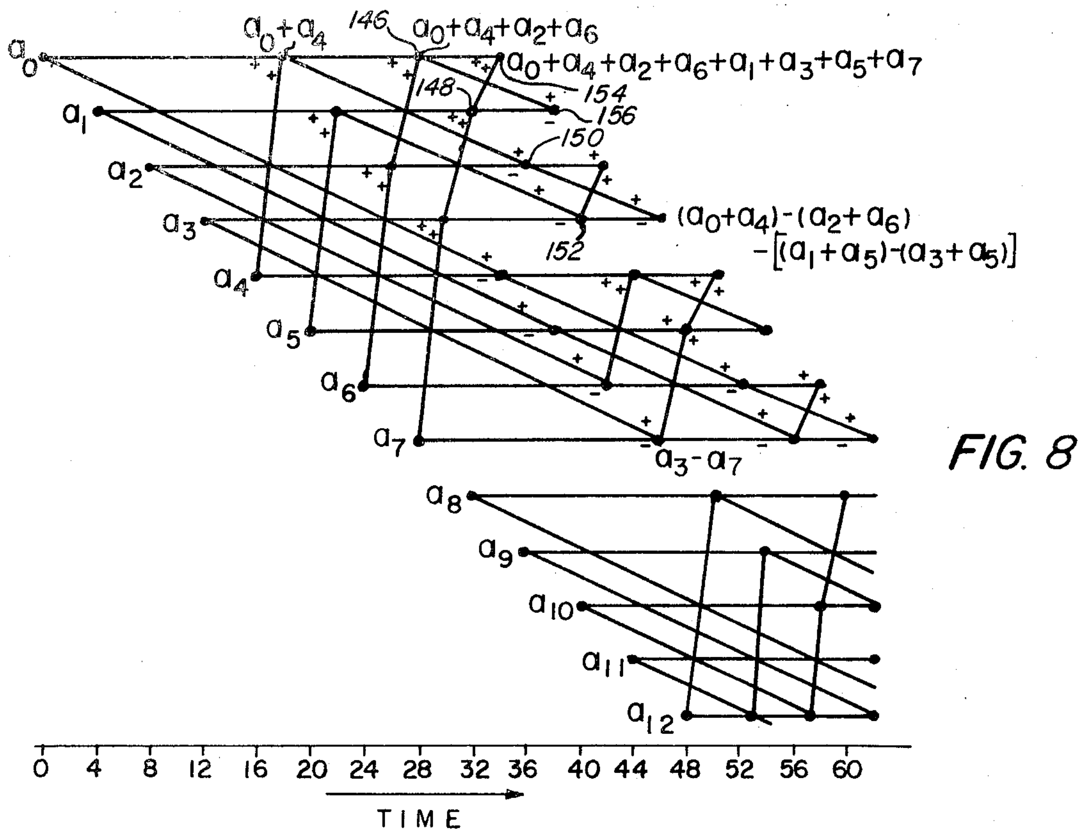
FIG. 8 is a modification of the flow graph of FIG. 5 showing a temporal relationship between the occurrences of the various points of the graph.

The cyclical operation of the modules 90, 92 and 94 can also be compared by means of the modified flow chart of FIG. 8. With reference to the eight data samples of the interval, namely $a_0 \ldots a_7$, the module 90 provides four summation terms respectively at times of 18, 22, 26 and 30 seconds, which are followed by four difference terms at the times 34, 38, 42 and 46 seconds. Two of these terms, namely, $(a_0+a_4)$ and $(a_3-a_7)$ are indicated on the diagram. These times are the same times as are given on the module output block 140 of FIG. 7A and 7B. The module 92 provides a pair of sum terms 146 and 148 at the times of 28 and 32 seconds respectively, this being followed by two difference terms 150 and 152 at the times of 36 and 40 seconds respectively, this being followed by another pair of sum terms at the times of 44 and 48 seconds respectively, and finally by a second pair of difference terms at the times of 52 and 56 seconds respectively. Thus, the module 92 has undergone two complete cycles during the one cycle of module 90. The module 94 provides a sum term 154 and a difference term 156 which occur at the times 34 and 38 seconds respectively. These terms 154 and 156 constitute one complete cycle of operation of the module 94. The module 94 then provides a second sum term at the time of 42 seconds, a second difference term at the time of 46 seconds, a third sum term at the time of 50 seconds, a third difference term at the time of 54 seconds, a fourth sum term at the time of 58 seconds and a fourth difference term at the time of 62 seconds thereby completing four cycles of operation during the one cycle of the module 90. A second cycle for the module 90 beginning with the data sample $a_8$ is partially shown in the Figure.

Referring again to FIG. 6 the indexer 96 will now be described. The indexer comprises a counter 158, a register 160, and two adders 162A–B, each of which is a modulo-2 adder. Individual connections are provided by lines 164, 166, and 168 to each of the individual cells or binary stages of the counter 158, one such stage providing the least significant bit indicated by lsb, the stage providing the least significant bit being designated msb. Similarly, individual connections are provided to each cell or binary stage of the register 160 along line 168, 170 and 172. The counter 158 is driven by a sequence of pulses provided by the synchronizer 82, one such pulse arriving at the counter 158 for each of the input data samples provided by the sampling gate 78. An output 3 bit binary number is provided by the register 160 simultaneously with the magnitude of the corresponding Walsh transform component appearing at the output of module 94. The synchronizer 82 resets the counter 158 to zero and then provides the aforementioned pulses for counting on line 174 with a suitable time delay with reference to the timing diagram on FIGS. 7A and 7B such that the output numbers provided by the register 160 are coordinated wth the occurrences of each of the Walsh transform components.

The indexer 96 operates as follows: Upon resetting of the counter 158 the number 0 appears both in the counter 158 and in the register 160 thus indicating the Walsh transform component of degree zero. Upon the arrival of the first pulse on line 174 a 1 appears in the lsb stage of the counter 158. The same 1 appears in the msb stage of the register 160. The same 1 and also a 0 on line 166 enter the adder 162A, which in response thereto, provides a 1 on line 170 to the middle cell of register 160. The output of adder 162A, is also applied to the adder 162B along with a zero on line 164 which results in a 1 appearing on line 172 for the lsb stage of the register 160. Thus, there appears in the register 160 the binary representation of the number 7 which, as seen in Table 1, is the number or degree of the second transform component produced by the module 94.

The second pulse to appear along line 174 results in the ldb stage of counter 158 changing to a 0 and a 1 appearing in the middle stage. The 0 on line 168 appears in the msb stage of register 160. The 0 and the 1 respectively on lines 168 and 166 enter the adder 162A to provide a 1 in the middle stage of the register 160. The output of the adder 162A and the 0 on line 164 enter the adder 162B to provide a 1 on line 172 to the lsb stage of the register 160. Thus the binary representation for the numeral 3 appears in the register 160 which by comparison with Table 1 is the degree of the third Walsh component to appear at the module 94.

As a final example of the operation of the indexer 96, in respose to the third pulse arriving along line 174 to the counter 158, a 1 appears in the lsb stage and also in the middle stage. The 1 on line 168 goes directly to the msb stage of register 160, and the 1 on line 168 and the 1 on line 166 are summed modulo-2 in the adder 162A to give a 0 on line 170. Thus a 0 appears in the middle stage of the register 160 and that 0 is summed with the 0 on line 164 by the adder 162B to give a 0 on line 172 for the lsb stage of the register 160. Thus, in the register 160 there is the binary representation of the numeral 4 which, as seen in the right hand column of Table I is the degree of the fourth Walsh transform component to be provided by the module 94. In a similar way it can be seen that in response to successive pulses along line 174, the indexer 96 provides sequentially the degrees of each of the Walsh transform components as they appear at the output of the module 94.

Figure 9:
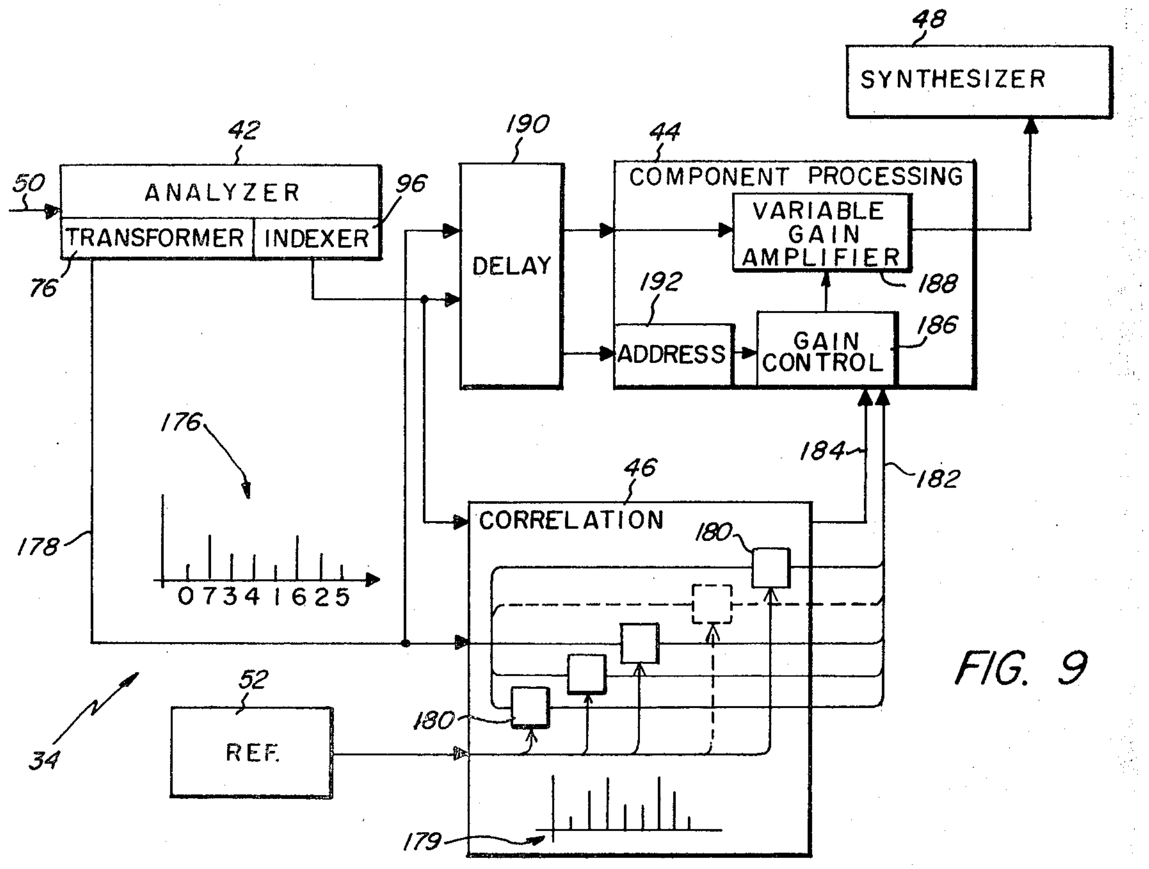
FIG. 9 is a block diagram of the signal restorer of FIG. 1.

Referring now to FIG. 9 there is shown a detailed block diagram of the signal restorer 34 seen earlier in FIG. 1. The analyzer 42 is seen comprising the transformer 76 and the indexer 96 described earlier with reference to FIG. 6. Successive Walsh transform components are shown illustratively by means of graph 176 with reference to line 178 whereby the Walsh transform components are transmitted from the analyzer 42 to the correlator 46. The correlator 46 uses a reference set of Walsh transform components shown illustratively by graph 179 and provided by the reference 52 against which the incoming components depicted in graph 176 are correlated. A simple form of correlator or comparison device is accomplished by means of a set of comparitors 180 which senses the magnitude of each of the transform components as they enter the correlator 46 and provides signals indicating whether these components are greater than or less than reference signals provided by the reference 52. In addition, the output numeral supplied by indexer 96 is transmitted to the correlator 46 so that the results of the correlation are identified with the correct transform component. The outputs of the correlator 46 and the indexer 96 are transmitted along lines 182 and 184 respectively to a gain control 186 which sets the gain of a variable gain amplifier 188. The transform components on line 178 pass via delay 190 into the component processor 44 through the variable gain amplifier 188 and into the synthesizer 48.

The variable gain amplifier 188 in response to signals provided by the gain control 186 amplifies or modulates each transform component by a different amount in accordance with the signals provided by the correlator 46 along line 182. In this way the relative amplitudes of the transform components are altered with the result that a signal synthesized in the synthesizer 48 from these modified components bears a more accurate representation to the signal provided by the source 22 of FIG. 1. The delay 190 is of sufficient duration such that the correlator 46 has adequate time to perform the correlation before the transform components enter the variable gain amplifier 188. Also, the output of the indexer 96 passes through the delay 190 to an address unit 192 which signifies to the gain control 186 which transform component is presently entering the variable gain amplifier so that the appropriate gain control signal can be applied to the variable gain amplifier 188.

The inverse transformation, providing the temporal waveform corresponding to a known distribution function of Walsh transform components, was stated earlier by Equation 5 and is repeated now for convenience $$fn=\sum_{m=0}^{N-1} F_m w_m(n;N) \qquad (5)$$

wherein there is a set of $N=2^m$ Walsh expansion coefficients $F_m$. The solution is $$f_n=\frac{1}{N}\sum_{m=0}^{N-1} F_m w_n(m;N) \qquad (21)$$

which indicates that $f_n$ can be obtained by inserting $F_m$ as the input to a transformer such as the transformer 76 of FIG. 6. Equation 21 may be proved by substituting into Equation 10 the relationship $$B_m B_m = NI \qquad (22)$$

where $N=2^M$ and $I \triangleq$ identify operator to give $$f=1/N\ B_m g \qquad (23)$$

Thus, it is seen that a synthesis of a waveform from the Walsh transform components can be obtained by utilizing for the synthesizer 48 a transformer such as a transformer 76 of FIG. 6. In view of the weighting of the transform components done by the component processor 44 it is apparent that the synthesized waveform differs from that provided by the sampling gate 78 of FIG. 6 and tends to resemble that of source 22 of FIG. 1.

It is also apparent that considerable information can be obtained at the output of the correlator 46 without the use of the component processors 44. For example, if it is desired to detect the presence or absence of a signal which is known to have specific Walsh transform components and the absence, or a low value, of other Walsh transform components, then the outputs of the comparators 180 in conjunction with the output of the indexer of FIG. 9 show whether or not a signal on line 50 of FIG. 1 and 9 bears a sufficiently close relationship to the signal of the source 22 such that it may be stated that there is a high probability that the signal on line 50 is due to the transition of a signal from the source 22 rather than a burst of noise from the interference source 30. The utilization device 26 of FIG. 1 may incorporate such decision circuitry to determine the probability, based on the outputs of the comparators 180, that the signal on line 50 is due to the transmission of a signal by the source 22.

As has already been mentioned, the foregoing transformations between a sampled analog waveform and a set of Walsh waveforms is based on the orthogonal properties of the Walsh waveform. It is interesting to note that Walsh waveforms are provided by the voltage waveforms representing the binary code words of the Reed-Muller codes. As is well known, the Reed-Muller codes are orthogonal.

Other orthogonal waveforms which are not found in the set of Walsh waveforms can be derived from Reed-Muller codes. Such a waveform is the voltage waveform of the DIGILOCK code described in an article in the IRE Transactions on Space Electronics and Telemetry entitled "DIGILOCK Telemetry System for the Air Force Special Weapons Center's Blue Scout, Jr." by Richard M. Jaffe, volume SET–8, pages 44–50, March 1962. Therein, with reference to the code words of FIG. 2 on page 45, each row of the DIGILOCK code can be converted to a corresponding row of the Reed-Muller code by summing modulo-2, a row of the DIGILOCK code with the first row of the DIGILOCK code.

A transformer, analagous to that of FIG. 6, based on a non-Walsh waveform is readily demonstrated by considering the relatively simple case of a four point data sampling interval and a set of four digit code words derived from a 4×4 Reed-Muller code matrix. Let $$\begin{matrix} 0 & 0 & 0 & 0 \\ 0 & 1 & 1 & 1 \\ 0 & 1 & 1 & 0 \\ 0 & 1 & 0 & 1 \end{matrix} \qquad (24)$$

be the Reed-Muller code matrix which is then modified to have the format $$\begin{matrix} 1 & 0 & 0 & \\ 1 & 0 & 1 & 0 \\ 1 & 1 & 1 & 0 \\ 1 & 1 & 0 & 1 \end{matrix} \qquad (25)$$

which is readily converted into matrix (24) by adding the word 1,000 modulo 2 to each row of the matrix (25). It is convenient to rewrite matrix (25) in the form such as that of Table 1 to show the bipolar (positive and negative) terms which will be used as multipliers of data samples. Accordingly, matrix (25) is rewritten as shown in Equation 26

$$\begin{bmatrix} D_0 \\ D_1 \\ D_2 \\ D_3 \end{bmatrix} = \begin{bmatrix} +1 & -1 & -1 & -1 \\ +1 & -1 & +1 & +1 \\ +1 & +1 & +1 & -1 \\ +1 & +1 & -1 & +1 \end{bmatrix} \cdot \begin{bmatrix} b_0 \\ b_1 \\ b_2 \\ b_3 \end{bmatrix} \qquad (26)$$

wherein a column vector representing four data samples $b_0 \ldots b_3$ is shown being multiplied by the matrix to produce a column vector representing four transform components $D_0 \ldots D_3$. For ease of reference, the 4×4 matrix in Equation 26 will hereinafter be referred to as the Q matrix, and the components $D_0 \ldots D_3$ as the $Q$ transform components. The $Q$ matrix is orthogonal since the dot product of any two rows is readily seen to be zero. Equation (26) is analogous to Equation (6) of the Walsh transform, and the comments made hereinbefore with reference to Equation (6) relative to orthogonal series representations of analog waveforms are also applicable to Equation (26). Performing the multiplication in Equation (26) gives $$D_0 = b_0 - b_1 - b_2 - b_3$$
$$D_1 = b_0 - b_1 + b_2 + b_3 \quad (27)$$
$$D_2 = b_0 + b_1 + b_2 - b_3$$
$$D_3 = b_0 + b_1 + b_2 + b_3$$

To develop a transformer which transforms the set of data samples $b_0 \ldots b_3$ into the set of transform components $D_0$ 2. . $D_3$, and being mindful that in a practical system the data samples may occur sequentially in time as was the case described with reference to the system of FIGS. 1 and 6, the terms appearing in Equations (27) will now be examined for the purpose of developing an algorithm which permits these equations to be implemented by means of a device having a structure similar to that described earlier with reference to FIG. 6.

It is noted that the Equations (27) may be viewed as composed of sums and differences of the terms $(b_0 \pm b_1)$ and $(b_2 \pm B_3)$ or, alternatively, by the terms $(b_0 \pm b_2)$ and $(b_1 \pm b_3)$. The terms of the latter alternative are more readily implemented in a device having the "pipeline" format of FIG. 6 since the delay between the times of occurrence of the signal $b_2$ and $b_0$ is greater than the time delay between the signals $b_1$ and $b_0$ thereby permitting greater freedom in the design of the transformer.

Figure 10:
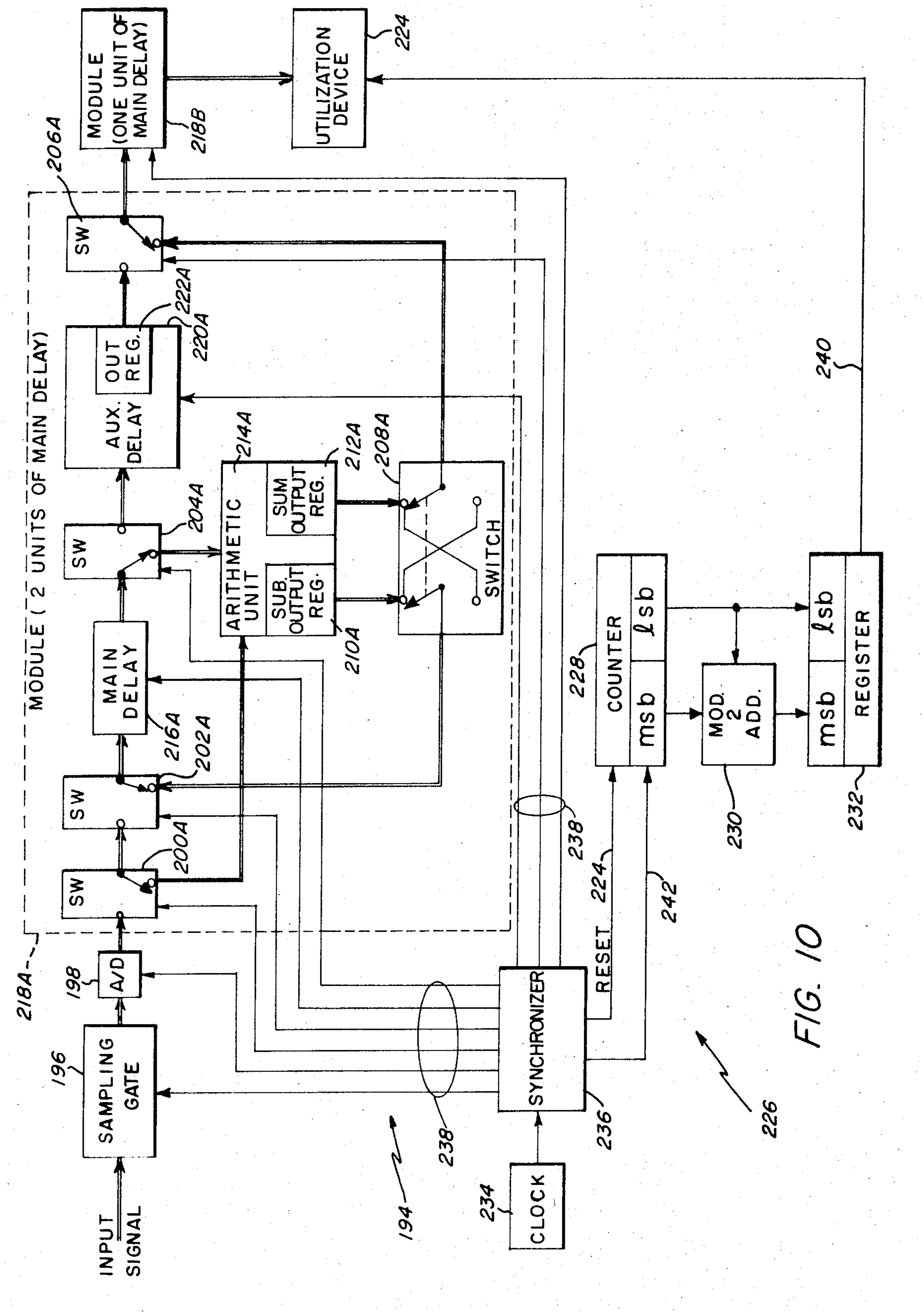
FIG. 10 is a block diagram of an alternative transformer generally applicable to transformations based on digitally generated waveforms.

An algorithm, in accordance with the invention, for implementing Equations (27) to compute the $Q$ transform in a manner which is suitable for both a computer as well as a "pipeline" device such as that to be described in FIG. 10 is shown by the following three sets of equations, Equations (28—30). Let $x_{n,m}$ be the contents of the nth data slot on the mth iteration. Then $$x_{00} = b_0$$
$$x_{10} = b_1 \quad (28)$$
$$x_{20} = b_2$$
$$x_{30} = b_3$$

in which $x_{n0}$ is a slot for each data sample in the sampling interval. Then, after the first interation the following quantities appear $$x_{01} = b_0 + b_2$$
$$x_{11} = b_1 - b_3 \quad (29)$$
$$x_{21} = b_0 - b_2$$
$$x_{31} = b_1 + b_3$$

which utilize the same number of data slots or storage locations as was utilized in Equations(28). In this example of a four point interval thare are two iterations. (An eight point sampling interval of eight data samples would require three iterations, a 16 point interval would require four iterations, and so on.) The second iteration provides the following quantities $$x_{02} = (b_0+b_2) + (b_1-b_3) = D_2$$
$$x_{12} = (b_0+b_2) - (b_1-b_3) = D_1$$
$$x_{22} = (b_0-b_2) - (b_1+b_3) = D_0 \quad (30)$$
$$x_{32} = (b_0-b_2) + (b_1+b_3) = D_3$$

which are recognized as being the transform components of Equations (27). Note that the order of appearance of the transform components, namely, $D_2$, $D_1$, $D_0$ and $D_3$ differs from that of the data slots $x_{0m}-x_{3m}$. An indexer for indexing these components, to be described in FIG. 10, is provided so that the quantities provided by the transformer of FIG. 10 are properly correlated with the appropriate transform components.

Figure 11:
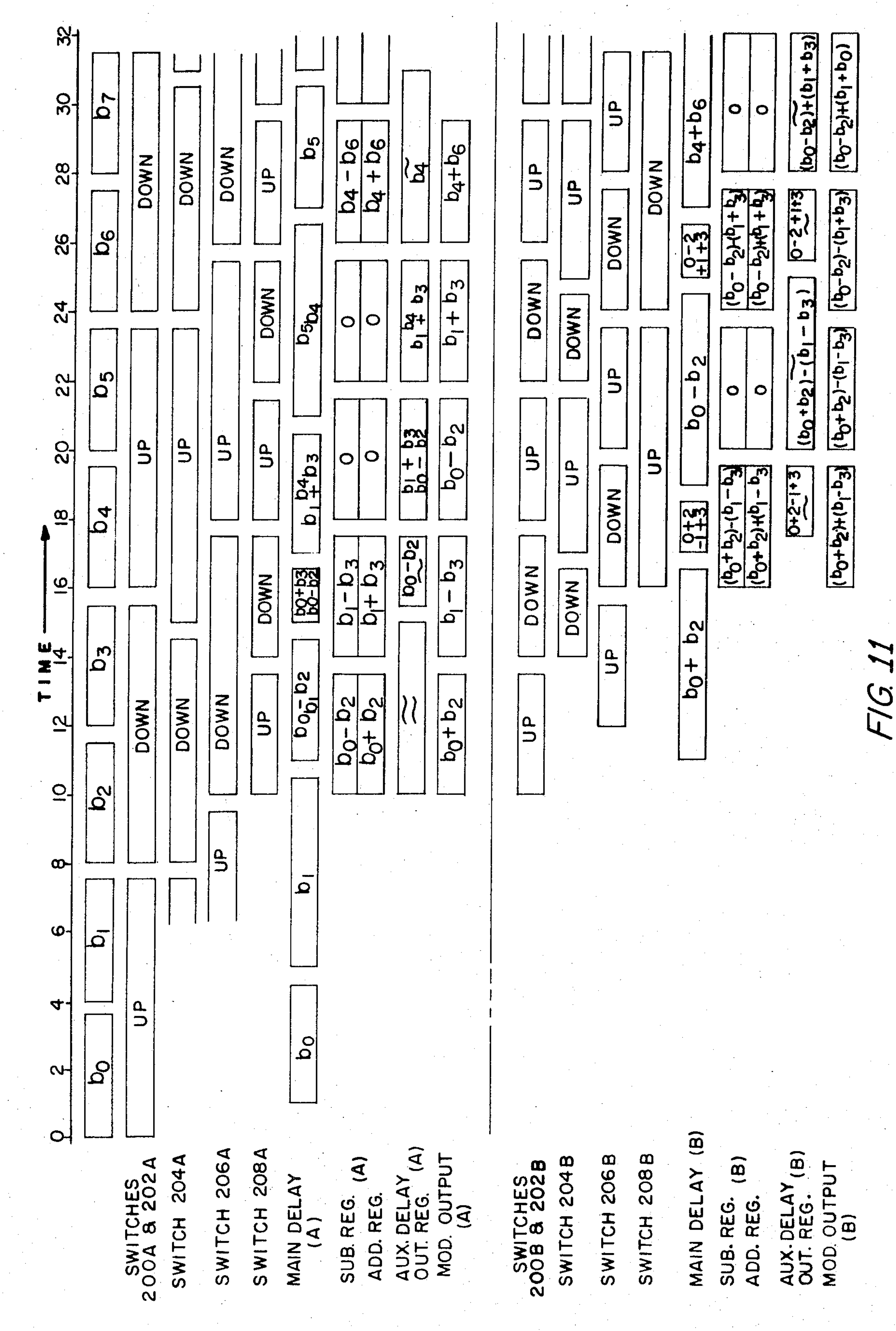
FIG. 11 is a timing diagram of the operation of the transformer of FIG. 10.

Referring now to FIGS. 10 and 11 there are shown respectively a block diagram and a timing diagram of a transformer 194 for providing the $Q$ transform components in accordance with the algorithm of Equations 28—30. The transformer 194 of FIG. 10 is very similar to that which was shown in FIG. 6. A sampling gate 196 and an A/D 198 correspond respectively to the sampling gate 78 and the A/D 80 of FIG. 6. Switches 200A, 202A, 204A and 206A of FIG. 10 correspond respectively to the switches 100, 102, 104 and 106 of FIG. 6. In addition, in FIG. 10 there is a switch 208A which alternately applies the quantities from the subtractor output register 210 and the sum output register 212 of an arithmetic unit 214 which corresponds to the arithmetic unit 108 of FIG. 6. A main delay 216A of module 218A is similar to the main delay of module 92 of FIG. 6 and has two units of delay. A similar main delay 216B as well as switches 200B, 202B, 204B and 206B of module 217B are referred to in the timing diagram of FIG. 11 but are not shown in the block diagram of FIG. 10. The main delay 216B has one unit of delay. Both the main delays 216A—B are conveniently implemented by means of shift registers. An auxiliary delay 220A having an output register 222A contained within the module 218A corresponds with the auxiliary delay 112 of FIG. 6. A similar auxiliary delay 220B of module 218B is referred to in the timing diagram of FIG. 11 but is not shown in the block diagram of FIG. 10. The module 218B of FIG. 10 applies the $Q$ transform components to a utilization device 224 which is similar to the utilization device 98 of FIG. 6.

In addition the transformer 194 of FIG. 10 comprises an indexer 226 which corresponds to the indexer 76 of FIG. 6. The indexer 226 comprises a counter 228, an adder 230 which performs modulo-2 additions, and a register 232 which correspond respectively to the counter 158, the adder 162A and the register 160 of FIG. 6. The transformer 194 as well as the indexer 226 are driven by a clock 234 and synchronizer 236 which function in the manner of the clock 84 and synchronizer 82 of FIG. 6. Timing signals for coordinating the operation of the various portions of the transformer 194 are provided along lines 238.

The implementation of Equations (28-30) by means of the transformer 194 is readily explained with the aid of the timing diagram of FIG. 11 which has a format that is similar to the format of FIGS. 7A and 7B. The data samples $b_0 \ldots b_3$ of the equations 28 are shown occurring sequentially in the top row of the timing diagram of FIG. 11. Additional data samples $b_4 \ldots b_7$ constituting a second sampling interval are also shown in FIG. 11. The data samples $b_0 \ldots b_7$ are provided by the sampling gate 196 and the A/D 198. The digital signals representing these data samples, provided by the A/D 198 are applied to the module 218A. The module 218A provides the first iteration corresponding to the equations 29. The four output quantities indicated by Equations (29) namely, $(b_0+b_2)$, $(b_1-_3)$, $(b_0-b_2)$ and $(b_1+b_3)$ are shown in the row labeled "module output (A)" in the timing diagram of FIG. 11. Also in that row in the quantity $(b_4+b_6)$ which is the first transform component produced by the module 218A in response to the second sampling interval of the data samples $b_4$ . . . $b_7$. These quantities are then applied to the module 218B which them implements the second iteration indicated by Equations (30) to produce the four output quantities of Equations(30), seen also in the timing diagram in the row labeled "module output (B)."

The operations of the switches, delays and registers, are shown by means of blocks in FIG. 11 in the identical fashion that these blocks are utilized in FIGS. 7A and 7B. The suffixes A and B correspond respectively to the components of the modules 218A and 218B. Thus, for example, it is seen that both switches 200A and 202A are in the UP position during the time of occurrence of the data samples $b_0$ and $b_1$. Here too it is convenient to assume a time scale of 1 second per square as was done in the timing diagram of FIGS. 7A and 7B even though the time scale may be on the order of microseconds in a practical system. Thus, switches 200A and 202A terminate the UP position at a time of 7 ½ seconds, undergo a transition interval of ½ second and begin the DOWN state at a time of 8 seconds, the DOWN state being retained for 8 seconds. Similarly, the two-celled main delay 216A is shown having the quantity $b_0$ in its first cell during the time interval extending from 1 second to 4 ½ seconds, the term $b_1$ and $b_2$ being shown respectively in the first and second cells of the main delay 216A during an interval of time extending from 5 seconds to a time of 10 ½ seconds.

Briefly, the module 218A performs the operations indicated by Equations 29 in the following manner. The terms $b_0$ and $b_1$ are entered into the main delay 216A by switches 200A and 202A. The switches 200A and 202A then switch to the DOWN state so that the next two data samples $b_2$ and $b_3$ are applied directly to the arithmetic units 214. The terms $b_0$ and $b_2$ are applied simultaneously to the arithmetic unit 214 which after a delay of approximately 2 seconds provides the quantity $(b_0-b_2)$ in the subtraction output register 210, and the quantity $(b_0+b_2)$ in the sum output register 212A. These pair of outputs are applied by switch 208A in its UP state to respectively the main delay 216A via switch 202A and the module 218B via the switch 206A now in its DOWN state. Next the terms $b_1$ and $b_3$ are applied to the arithmetic unit 214 with the result that after a delay of approximately 2 seconds the quantities $(b_1-b_3)$ and $(b_1+b_3)$ appear respectively in the subtraction and sum output registers 210 and 212. As noted in the timing diagram of FIG. 11 the switch 208A has switched to the DOWN state at a time of 14 seconds and remains in the DOWN state for a period of 3 ½ seconds during which time these quantities appear in the subtaaction and sum output registers 210 and 212. Accordingly, the quantities $(b+b_3)$ and $(b_1-b_3)$ are applied respectively to the main delay 216A via switch 202A, and to the module 218B via switch 206A.

It is thus seen that the module 218B has received the quantities $(b_0+b_2)$ first appearing at a time of 10 seconds, and $(b_1-b_3)$ first appearing a a time of 14 seconds. Meanwhile the quantities $(b_0-b_2)$ and $(b_0+b_3)$ are passing through the main delay 216A and the auxiliary delay 220A to appear in the output register 222A, the quantity $(b_0-b_2)$ first appearing in the output register 222A at a time of 18 seconds and the quantity $(b_1+b_3)$ first appearing in the output register 222A at a time of 22 seconds. Thus, the four output quantities shown in Equation (29) have appeared sequentially and at a regular repetition rate at the output of the module 218A.

A distinguishing feature of the transformer 194 as compared to the transformer 76 of FIG. 6 is the use of the switch 208A to invert the application of the outputs of the arithmetic unit 214 so that as shown in the example of the transformer 194, processing a four point sample interval, the sum and difference of the arithmetic unit 214A are applied alternately to the main delay 216A and the module 218B, rather than as was shown in the transformer 76 wherein the difference output was always applied to the main delay 110 while the sum output was always applied to the next module 92.

The module 218B has the same form as the module 218A, the only difference being in the main delay 216B which contains only one unit of delay as compared to the two units of delay of the main delay 216A. Accordingly, the timing diagram for the operation of the module 218B as seen in the power portion of FIG. 11 has the same general format as does the timing diagram for the module 218A with the basic difference being a more frequent operation of the switches 200B, 202B, 204B and 206B.

Thus, the operation of the module 218B is readily described as follows. The quantity $(b_0+b_2)$ appearing at the output of module 218A is applied to the main delay 216B via switches 200B and 202B which are in the UP state which are indicated in the timing diagram of FIG. 11. Then, at a time of 14 seconds, the quantity $(b_1-b_3)$ is applied via switch 200B, now in the DOWN state, to the arithmetic unit 214B. At the same time the quantity $(b_0+b_2)$ in the main delay 216B is also applied to the arithmetic unit 214B via switch 204B now in the DOWN state. In response to the quantities $(b_0+b_2)$ and $(b_1-b_3)$ the arithmetic unit 214B provides the sum and difference quantities, $(b_0+b_2) - (b_1-b_3)$ and $(b_0+b_2) + (b_1-b_3)$ respectively in the subtraction and sum output registers 210B and 212B. As seen in the timing diagram these sum and difference quantities first appear at a time of 16 seconds. The sum quantity, namely, $(b_0+b_2) + (b_1-b_3)$ now appears at the module output to be applied to the utilization device 224 until a time of 19 ½ seconds; and the difference quantity, namely, $(b_0+b_2) - (b_1-b_3)$ is passed via switches 208B, 202B and 204B through the main delay 216B and the auxiliary delay 220B to appear in the output register 222B at a time of 20 seconds, and is applied to the utilization device 224 via switch 206B until a time of 23 ½ seconds.

Continuing with the operation of the module 218B, the quantity $(b_0-b_2)$ at the output of module 218A now passes into the main delay 216B via switches 200B and 202B. At a time of 22 seconds the quantity $(b_0b-b_2)$ in the main delay 218B is made available to the arithmetic unit 214B via switch 204B, and the quantity $(b_1+b_3)$ in the output of module 218A is applied to the arithmetic unit 214B via switch 200B. In response to the application of these two quantities the arithmetic unit 214B provides in its subtraction and sum output registers 210B and 212B respectively the quantities $(b_0-b_2) - (b_1+b_3)$ and $(b_0-b_2) + (b_1+b_3)$. The quantity in the subtraction output register 210B is applied via switch 208B, now in its DOWN state, at a time of 24 seconds to the utilization device 224 until a time of 27 ½ seconds. The quantity in the sum output register 212B is applied via switch 208B now in the DOWN state, switch 202B now in the DOWN state and switch 204B now in the UP state through the main delay 216B and the auxiliary delay 220B to appear in the output register 222B as the module output at a time of 28 seconds and is applied via switch 206B now in the UP state to the utilization device 224 until a time of 31 ½ seconds.

It is interesting to note that in the final module, namely module 218B the state of the switch 208B is not critical. For example, it may remain in the UP state continuously, or alternatively it may remain in the DOWN state continuously, or as a further example it may switch states as is indicated in the timing diagram once every 8 seconds. Thus, it is in the UP state from the time of 16 seconds until the time of 23 ½ seconds, undergoes a transition period during the next ½ second to appear in the DOWN state at a time of 24 seconds, and remain in the DOWN state until a time of 31 ½ seconds. This particular selection of the switching times of the switch 208B provides the output quantities in the sequence indicated by the Equations (30).

In order to indicate just which transform component is appearing at a given time at the output of the module 218B, the indexer 226 provides a digital number along line 240 to the utilization device 224. The counter 228 counts pulses provided along line 242, a count of zero being established at the appropriate instant by means of a reset signal on line 244. It is readily verified that when the counter 228 shows a count of 2, there being in binary representation a 1 appearing in the cell of the most significant bit indicated by msb, and a 0 appearing in the cell for the least significant bit, then a 0 appears in the lsb cell of the register 232 and a 1 appears in the msb cell of the register 232, the 1 being equal to the modulo-2 addition of the 1 of the counter msb cell and the 0 of the counter lsb cell. Thus, the register 232 has a binary number representing the numeral 2. At the occurrence of the next pulse on line 242 the counter 228 exhibits the binary representation for the numeral 3, namely, 11. The 1 of the lsb cell of the counter 228 appears in the lsb cell of the register 232 and is also applied to the adder 230. The 1 of the msb cell of the counter 228 is applied to the adder 230 which provides a 0 output to the msb cell of the register 232, the 0 output being the modulo-2 sum of the 1's of the msb and lsb cells of the counter 228. Thus, the number appearing in the register 232 is the digital representation of the number 1. At the occurrence of the next pulse on line 242 the counter 228 provides a 0 output since it is a modulo-4 counter. Accordingly, the output at the register 232 is also 0; and finally, in response to another pulse on line 242 the counter 228 provides a 1 in the lsb cell. The 1 appears in the lsb cell of the register 232, and by virtue of the modulo 2 adder 230 a 1 also appears in the msb cell of the register 232, this being the digital representation of the numeral 3. Thus the register 232 has provided sequentially the digital representations of the numerals 2, 1, 0 and 3, these corresponding to the index numbers of the transform components of Equations (30).

It is interesting to note that with the exception of the switches 208A and 208B in the modules 218A and 218B, these modules are identical to the modules 92 and 94 of the transformer 76 in FIG. 6. It is thus seen that the transformer 76 utilized in providing the Walsh transform components is a special case of the more general situation which treats sets of digital orthogonal waveforms derived from any orthogonal matrix such as the $Q$ matrix of Equation (26) while the transformer 194 represents the general case and is suitable for handling transformations based on digital waveforms derived from any orthogonal matrix, be it the Walsh waveforms of the Reed-Muller matrix or the $Q$ waveforms of the $Q$ matrix. In the event that the transformer 194 is used to process Walsh transformations, then the switches 208A and 208B would remain in their UP states throughout the transformation process. It is also clear that the transformer 194 may be extended to cover higher order intervals such as an 8 point sampling interval or a 16 point sampling interval simply by adding additional modules, so that for example, in the case of a 16 point sampling interval four modules would be used, the first module having a main delay of eight delay units, the second module having a main delay of four delay units such as the module 90 described with reference to FIG. 6, and the third and fourth having respectively main delays of two delay units and one delay unit as was described with reference to FIG. 10.

It is readily seen by a reexamination of the waveforms of FIGS. 2 and 3 as well as the derivation of the $Q$ matrix as seen in Equations (24—26) that matrices and waveforms for higher order intervals are derived from the simpler matrices and waveforms. For example, a derivation of the waveforms of FIG. 3 from that of FIG. 2 is accomplished by halving the spacings between the zero crossings of the waveforms following a procedure in which the total number of zero crossings is increased by 1 for waveforms of successively higher degree. Because of this halving procedure it is evident that pairs of numbers such as those shown in the parenthesis of Equations (30) can always be extracted so that a suitable algorithm and its associated transformer can be developed for any desired set of digital orthogonal waveforms.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. In combination:

a plurality of computation units serially connected to each other, each of said computation units having an input and an output and being responsive to an input signal, the output of one of said computation units being coupled to the input of the next of said computation units for forming a transformation of an input signal coupled to said one computation unit, each of said computation units comprising:

means for storing a plurality of signals, arithmetic means connecting with an input of said computation unit and said storage means for extracting pairs of signals and forming arithmetic combinations of the signals of said pairs of signals, said arithmetic combinations being the sums and the differences of the signals of said pairs of signals, one signal of a pair of said pairs of signals being an input signal to said computation unit and the other signal of a pair of said pairs of signals being extracted from said storage means, and a feedback path coupling an output of said arithmetic means to an input of said storage means, said feedback path placing one of said arithmetic combinations in said storage means; and means coupled to each of said computation units for coordinating said forming of said arithmetic combinations and said placing of said one arithmetic combination in said storage means in each of said computation units in accordance with a predetermined formulation to provide said transformation.

2. The combination defined by claim 1 further comprising means coupled to said coordinating means for indexing said sums and said differences, said indexing means comprising a counter and modulo-2 adder for combining outputs of individual cells of said counter.

3. In combination:

a plurality of modules serially connected, the first one of said modules being responsive to a series of input quantities, the last one of said modules providing a series of output data quantities, each of said modules comprising:

an adder;

a subtractor; and serial memory means interconnecting said adder and said subtractor, said serial memory means of successive ones of said modules providing overflows at the occurrences of sequences of data quantities, said sequences being of predetermined lengths such that said length of the sequence of one of said modules is one-half the length of the sequence of a preceeding one of said modules, the data quantities obtained from an adder and a subtractor of one of said modules being scaled by the same factor as the data quantities obtained from an adder and a subtractor of a second of said modules, said factor being unity; and means operating in synchronism with each of said modules for providing an index value corresponding to each of said output data quantities.

4. A combination as defined by claim 3 further comprising means for correlating the values of said sequences of data quantities provided by one of said modules with a reference.

5. In combination:

a series of modules responsive to sequences of signals, there being $2^n$ signals in one of said sequence of signals, there being $n$ modules in said series of modules, each of said modules comprising:

an arithmetic unit responsive to said signals for combining such ones of said signals as are applied to said arithmetic unit;

means for delaying the application of certain ones of said signals to said arithmetic unit, the input of said delay means being coupled to the input of said module, the output of said delay means being coupled to said arithmetic unit; and means for providing a sequence of said combined signals in a predetermined order, said sequence providing means being coupled to an output of said arithmetic unit;

said modules interconnected in an iterated format with the sequence of said combined signals provided by one of said modules applied to a second of said modules, the sequence providing means in each of said modules including means coupled to an input of said delaying means for recirculating a portion of said sequence through said delaying means, and the combining of signals in each of said modules being accomplished with a scaling of signals by the same factor, said factor being unity.

6. The combination defined by claim 5 further comprising means for providing numerals for identifying signals in said sequence of combined signals of the $n$th module, said numeral providing means being coupled to sais sequence providing means, said numeral providing means comprising a counter and a modulo-2 adder for combining signals from a pair of cells of said counter.

7. A signal processing system comprising:

means for sampling a signal at predetermined times;

means coupled to said sampling means for performing an orthogonal digital transformation of a group of said sampled signals by an orthogonal array of unitary factors to provide a set of products, said transformation performing means including a plurality of storage media coupled to said sampling means, said transformation performing means further including means coupled to said storage media for selectively recycling signals through one of said storage media while transmitting selected signals to another of said storage media, said recycling means comprising means coupled to said sampling means for forming sequences of signals in which all signals are scaled by a factor of unity; and means for correlating each term of said set of products with a set of reference terms, said correlating means being coupled to said transformation performing means.

8. The system as described by claim 7 further comprising means for modulating terms of said set of products in accordance with signals received from said correlator means, said modulating means being coupled to said transformation performing means.

9. The system as defined by claim 8 further comprising means responsive to said modulated terms for synthesizing therefrom an output signal, said synthesizing means being coupled to said modulating means.

10. In combination:

a plurality of modules arranged serially for processing input signals arriving sequentially at a first one of said serially arranged modules, each of said modules having an input and an output, an output of one of said modules being connected to an input of a second of said modules, each of said modules forming combinations of pairs of signals at said input to provide at the output of a last one of said serially arranged modules a set of output signals orthogonally related to said input signals;

each of said modules comprising arithmetic means and delay means, means for alternately switching signals at said input to said delay means and said arithmetic means, means for coupling signals from an output of said delay means to said arithmetic means, and means for alternately directing sequences of output signals of said arithmetic means via a feedback path to said delay means and to an output of said module;

said arithmetic means forming the sums of signals and the differences of signals, said output signals of said arithmetic means having values equal to said sums and said differences, said directing means alternately interchanging said sum output signals and said difference output signals; and said delay units in successive modules being of successively smaller delay to provide said orthogonal relationship.

* * * * *

UNITED STATES PATENT OFFICE
CERTIFICATE OF CORRECTION

Patent No. 3,742,201 Dated June 26, 1973

Inventor(s) Herbert L. Groginsky

It is certified that error appears in the above-identified patent and that said Letters Patent are hereby corrected as shown below:

Column 5, Equation 3, "$f_n$-" should be -- $f_n$= --

Column 6, Equation 10, "F = Bf" should be -- $\underline{F} = B\underline{f}$ --

Column 6, line 49, "couter" should be -- counter --

Column 7, line 53, "$x_{n;0}$" should be -- $x_{n,0}$ --

Column 7, line 58, "$x_{n,m}$ = " should be -- $x_{n,M}$ = --

Column 8, Equation 19, last line, "$(a_1+a_5+a_3-a_7)$" should be -- $(a_1-a_5-a_3+_7)$ --.

Column 8, Equation 20, first line, delete "$+a_5$", second occurrence.

Column 8, Equation 20, third line, "$+a_7$" should be -- $-a_7$ --

Column 8, Table I, last column, "m" should be -- $\underline{m}$ --

Column 8, Table I, column 7, line 2, "+1" should be -- -1 --

Column 10, line 7, after "94" insert -- are --

Column 11, line 55, delete "a"

Column 13, line 41, "$a_1 - a_4$," should be -- $a_0 - a_4$, --

Column 14, line 24, delete "and"

Column 14, line 45, "$(a_0a_4)$" should be -- $(a_0 + a_4)$ --

USCOMM-DC 60376-P69
☆ U.S. GOVERNMENT PRINTING OFFICE : 1969 O—366-334

UNITED STATES PATENT OFFICE

CERTIFICATE OF CORRECTION

Patent No. 3,742,201 Dated June 26, 1973

Inventor(s) Herbert L. Groginsky

It is certified that error appears in the above-identified patent and that said Letters Patent are hereby corrected as shown below:

Column 14, line 65, after "each" insert -- single --

Column 15, line 39, "least" should be "most"

Column 16, line 18, "respose" should be -- response --

Column 17, Equation 5, "fn =" should be -- $f_n$ = --

Column 17, Equation 23, "f = 1/N $B_m$g" should be -- $\underline{f}$ = 1/N $B_m\underline{g}$ --

Column 18, Equation 24, second column, second line, "1" should be -- 0 --

Column 18, Equation 25, first line, last column, insert -- 0 --

Column 18, Equation 25, second line, last column "0" should be -- 1 --

Column 19, line 7, "$D_0$2..$D_3$," should be -- $D_0 \ldots D_3$, --

Column 19, line 39, "interation" should be -- iteration --

Column 20, line 16, "217B" should be -- 218B --

Column 20, line 55, "($b_1$-$_3$)," should be -- ($b_1$ - $b_3$), --

Column 20, line 58, "in" should be -- is --

Column 20, line 62, "them" should be -- then --

UNITED STATES PATENT OFFICE
CERTIFICATE OF CORRECTION

Patent No. 3,742,201 Dated June 26, 1973

Inventor(s) Herbert L. Groginsky

It is certified that error appears in the above-identified patent and that said Letters Patent are hereby corrected as shown below:

Column 21, line 43, "subtaaction" should be -- subtraction --

Column 21, line 45, "$(b + b_3)$" should be -- $(b_1 + b_3)$ --

Column 21, line 50, "a" (first occurrence) should be -- at --

Column 21, line 51, "$(b_0 + b_3)$" should be -- $(b_1 + b_3)$ --

Column 22, line 9, "power" should be -- lower --

Column 22, line 42, "$(b_0b - b_2)$" should be -- $(b_0 - b_2)$ --

Column 25, line 60, Claim 6, "sais" should be -- said --

Signed and sealed this 24th day of September 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334

UNITED STATES PATENT OFFICE

CERTIFICATE OF CORRECTION

Patent No. 3,742,201 Dated June 26, 1973

Inventor(s) Herbert L. Groginsky

It is certified that error appears in the above-identified patent and that said Letters Patent are hereby corrected as shown below:

Column 5, Equation 3, "$f_n$ -" should be -- $f_n$ = --.

Column 6, Equation 10, "F = Bf" should be -- $\underline{F}$ = B$\underline{f}$ --.

Column 6, line 49, "couter" should be -- counter --.

Column 7, line 53, "$x_{n;0}$" should be -- $x_{n,0}$ --.

Column 7, line 58, "$x_{n,m}$ =" should be -- $x_{n,M}$ = --.

Column 8, Equation 19, last line, "$(a_1+a_5+a_3-a_7)$" should be -- $(a_1-a_5+a_3-a_7)$ --.

Column 8, Equation 20, first line, delete "$+a_5$", second occurrenc

Column 8, Equation 20, third line, "$+a_7$" should be -- $-a_7$ --.

Column 8, Table I, last column, "m" should be -- $\underline{m}$ --.

Column 8, Table I, column 7, line 2, "+1" should be -- -1 --.

Column 10, line 7, after "94" insert -- are --.

Column 11, line 55, delete "a".

Column 13, line 41, "$a_1 - a_4$," should be -- $a_0 - a_4$, --.

Column 14, line 24, delete "and".

Column 14, line 45, "$(a_0a_4)$" should be -- $(a_0 + a_4)$ --.

UNITED STATES PATENT OFFICE

CERTIFICATE OF CORRECTION

Patent No. 3,742,201 Dated June 26, 1973

Inventor(s) Herbert L. Groginsky

It is certified that error appears in the above-identified patent and that said Letters Patent are hereby corrected as shown below:

Column 14, line 66, after "each" insert -- single --.

Column 15, line 39, "least" should be "most".

Column 16, line 18, "respose" should be -- response --.

Column 17, Equation 5, "fn =" should be -- $f_n$ = --.

Column 17, Equation 23, "f = 1/N $B_m$g" should be -- $\underline{f}$ = 1/N $B_m\underline{g}$ --.

Column 18, Equation 24, second column, second line, "1" should be -- 0 --.

Column 18, Equation 25, first line, last column, insert -- 0 --.

Column 18, Equation 25, second line, last column, "0" should be -- 1 --.

Column 19, line 7, "$D_0$2..$D_3$," should be -- $D_0$ ... $D_3$, --.

Column 19, line 39, "interation" should be -- iteration --.

Column 20, line 16, "217B" should be -- 218B --.

Column 20, line 55, "($b_1$-$_3$)," should be -- ($b_1$ - $b_3$), --.

Column 20, line 58, "in" should be -- is --.

Column 20, line 62, "them" should be -- then --.

UNITED STATES PATENT OFFICE

CERTIFICATE OF CORRECTION

Patent No. 3,742,201 Dated June 26, 1973

Inventor(s) Herbert L. Groginsky

It is certified that error appears in the above-identified patent and that said Letters Patent are hereby corrected as shown below:

Column 21, line 43, "subtaaction" should be -- subtraction --.

Column 21, line 45, "$(b + b_3)$" should be -- $(b_1 + b_3)$ --.

Column 21, line 50, "a" (first occurrence) should be -- at --.

Column 21, line 51, "$(b_0 + b_3)$" should be -- $(b_1 + b_3)$ --.

Column 22, line 9, "power" should be -- lower --.

Column 22, line 42, "$(b_0 b - b_2)$" should be -- $(b_0 - b_2)$ --.

Column 25, line 60, Claim 6, "sais" should be -- said --.

Signed and Sealed this

*second* Day of *December 1975*

[SEAL]

*Attest:*

RUTH C. MASON
*Attesting Officer*

C. MARSHALL DANN
*Commissioner of Patents and Trademarks*